(12) United States Patent
Erbey et al.

(10) Patent No.: US 11,485,237 B2
(45) Date of Patent: Nov. 1, 2022

(54) MULTI-MOTOR SWITCHING SYSTEM AND METHOD FOR OPTIMIZED PERFORMANCE

(71) Applicant: System73 Ltd, Floriana (MT)

(72) Inventors: William Erbey, Christiansted, VI (US); Doron Paz, Alameda, CA (US); Duo Zhang, Lakewood, OH (US); Mattias Bergstrom, Tenerife (ES)

(73) Assignee: System73 LTD., Floriana (MT)

( * ) Notice: Subject to any disclaimer, the term of this patent is extended or adjusted under 35 U.S.C. 154(b) by 0 days.

(21) Appl. No.: 16/945,744

(22) Filed: Jul. 31, 2020

(65) Prior Publication Data

US 2021/0031634 A1    Feb. 4, 2021

Related U.S. Application Data

(60) Provisional application No. 62/881,759, filed on Aug. 1, 2019, provisional application No. 62/988,334, filed on Mar. 11, 2020.

(51) Int. Cl.
*B60L 15/20* (2006.01)
*B60K 1/02* (2006.01)
(Continued)

(52) U.S. Cl.
CPC ............ *B60L 15/2045* (2013.01); *B60K 1/02* (2013.01); *B60L 7/10* (2013.01); *G01C 21/3407* (2013.01); *G01C 21/3453* (2013.01)

(58) Field of Classification Search
CPC ... G01C 21/3453; G01C 21/3407; B60L 7/10; B60L 15/2045; B60K 1/02
See application file for complete search history.

(56) References Cited

U.S. PATENT DOCUMENTS

| 4,270,622 A | 6/1981 | Travis |
| 5,289,890 A | 3/1994 | Toyoda et al. |

(Continued)

FOREIGN PATENT DOCUMENTS

| DE | 102015215393 A1 | 9/2016 |
| EP | 2116412 A2 | 11/2009 |

(Continued)

OTHER PUBLICATIONS

International Search Report of PCT/US2020/044661 dated Oct. 21, 2020.
Written Opinion of PCT/US2020/044661 dated Oct. 21, 2020.

*Primary Examiner* — Luis A Martinez Borrero
(74) *Attorney, Agent, or Firm* — Mayer Brown LLP

(57) ABSTRACT

A multi-motor switching system and method for obtaining a global optimization of performance criteria that takes into account variables and conditions across an entire driving cycle. The controller of the system is adapted to conduct a global optimization in that it determines the most optimal distribution of motor loads over an entire trip or driving cycle, as opposed to sequentially determining the optimized solution for a given point of time and localized set of current condition. In one embodiment where the control system provides for global optimization, the controller receives trip information through a trip planning tool. The controller utilizes the trip information to generate a driving cycle and further incorporates this information into the optimization process performed by the controller to determine the optimal solution for the entire trip.

20 Claims, 21 Drawing Sheets
(21 of 21 Drawing Sheet(s) Filed in Color)

(51) Int. Cl.
*G01C 21/34* (2006.01)
*B60L 7/10* (2006.01)

(56) References Cited

U.S. PATENT DOCUMENTS

| | | | |
|---|---|---|---|
| 5,374,877 | A | 12/1994 | Imaseki et al. |
| 5,549,172 | A | 8/1996 | Mutoh et al. |
| 6,364,806 | B1 | 4/2002 | Spaniel |
| 8,016,061 | B2 | 9/2011 | Jeon et al. |
| 8,232,750 | B2 | 7/2012 | Smugeresky et al. |
| 8,453,770 | B2 * | 6/2013 | Tang .................. B60L 15/2036 180/65.6 |
| 8,618,752 | B2 | 12/2013 | Zing et al. |
| 8,761,985 | B2 * | 6/2014 | Tang ..................... B60W 10/08 701/22 |
| 8,950,529 | B2 * | 2/2015 | Ross ........................ B60K 1/04 903/906 |
| 9,038,759 | B2 | 5/2015 | Kaneko et al. |
| 9,050,972 | B2 * | 6/2015 | Severinsky ............ B60K 6/365 |
| 9,233,691 | B2 | 1/2016 | Tseng et al. |
| 9,707,835 | B2 * | 7/2017 | Washburn ................ B60K 1/02 |
| 9,789,871 | B1 * | 10/2017 | Dlala .................... B60W 10/08 |
| 9,800,182 | B2 | 10/2017 | Zhou et al. |
| 9,849,869 | B2 * | 12/2017 | Frank .................... B60W 20/10 |
| 10,131,248 | B2 * | 11/2018 | Tang .................. B60L 15/2036 |
| 10,144,309 | B2 * | 12/2018 | Leng ........................ B60L 50/60 |
| 10,744,889 | B1 * | 8/2020 | Rippelmeyer ...... B60L 15/2054 |
| 11,279,241 | B2 * | 3/2022 | Erbey ................. B60L 15/2009 |
| 2004/0007998 | A1 * | 1/2004 | Yasohara ................ H02P 6/153 318/437 |
| 2005/0046375 | A1 * | 3/2005 | Maslov .................. H02P 25/08 318/650 |
| 2005/0127789 | A1 * | 6/2005 | Magnussen ......... H01L 41/0906 310/328 |
| 2008/0116759 | A1 * | 5/2008 | Lin ....................... H02P 25/188 310/156.01 |
| 2009/0309416 | A1 * | 12/2009 | Bose ..................... B60W 10/26 307/9.1 |
| 2010/0025131 | A1 * | 2/2010 | Gloceri ................... B60K 6/52 180/65.265 |
| 2010/0135825 | A1 * | 6/2010 | Waith ..................... F25J 1/0298 62/611 |
| 2010/0222953 | A1 * | 9/2010 | Tang ........................ B60L 15/20 701/22 |
| 2011/0213518 | A1 * | 9/2011 | Welchko ............... H02P 29/032 318/434 |
| 2013/0241445 | A1 * | 9/2013 | Tang ...................... B60W 10/08 318/52 |
| 2014/0103658 | A1 * | 4/2014 | Ross ....................... H02K 16/02 318/45 |
| 2015/0006001 | A1 * | 1/2015 | Kawata ................. B60W 10/10 180/65.265 |
| 2015/0057856 | A1 * | 2/2015 | Ueda ........................ B60L 7/14 180/65.265 |
| 2015/0232082 | A1 * | 8/2015 | Frank .................. B60W 30/182 180/65.265 |
| 2015/0298574 | A1 * | 10/2015 | Bramson ............. B60L 15/2045 701/22 |
| 2015/0328976 | A1 * | 11/2015 | Wu ........................ F16H 3/087 180/65.23 |
| 2016/0272087 | A1 * | 9/2016 | Lai ...................... B60L 15/2045 |
| 2016/0347203 | A1 * | 12/2016 | Leng ........................ B60L 50/60 |
| 2017/0050536 | A1 * | 2/2017 | Martin ................... B60K 17/356 |
| 2018/0022339 | A1 * | 1/2018 | Leone .................. F02M 25/022 701/22 |
| 2018/0086343 | A1 * | 3/2018 | Crain .................... B60W 30/18 |
| 2018/0141537 | A1 | 5/2018 | Schobeb et al. |
| 2019/0023153 | A1 * | 1/2019 | Vallbracht ............... B60L 15/20 |
| 2020/0039362 | A1 * | 2/2020 | Ronning ............... B60K 17/354 |
| 2020/0259439 | A1 * | 8/2020 | Yoshino ................. H02P 27/085 |
| 2020/0262299 | A1 * | 8/2020 | Ronning ............... B60K 17/356 |
| 2020/0274375 | A1 * | 8/2020 | Griffiths ............... H02J 7/0029 |
| 2020/0391721 | A1 * | 12/2020 | Wang ..................... B60W 10/06 |
| 2021/0031634 | A1 * | 2/2021 | Erbey ................. B60L 15/2009 |
| 2021/0123442 | A1 * | 4/2021 | Schrader ............... H02P 25/022 |
| 2021/0170883 | A1 * | 6/2021 | Hu ........................... B60K 1/02 |
| 2021/0323416 | A1 * | 10/2021 | Erbey ................. B60L 15/2045 |

FOREIGN PATENT DOCUMENTS

| | | |
|---|---|---|
| JP | 05-328529 A | 12/1993 |
| JP | 07-46721 A | 2/1995 |
| JP | 07-131994 A | 5/1995 |
| JP | 2843339 B2 | 1/1999 |
| JP | 2010-083361 A | 4/2010 |
| JP | 2012-060729 A | 3/2012 |
| JP | 5880081 B2 | 3/2016 |
| JP | 2017158323 A | 9/2017 |
| WO | 2015/131180 A1 | 9/2015 |
| WO | 2021/022232 A1 | 2/2021 |

* cited by examiner

Raster of 4 x 4 points in 2-Dimensional Space

- The raster has a total of 16 points.
- Let y assume the values 0, .33, .67, 1
- Let x assume the values 0, .33, .67, 1
- For each x,y, the value of z is known: $z = 1 - x - y$ Power Curve and efficiency contours for: Case 1, Motor C, large motor. The 0.97 region is low-right.

Power Curve and efficiency contours for: Case 1, Motor A, small motor
Valid points lie below both blue curves.
The 1167 W curve shows constant motor loss.

Power Curve and efficiency contours for: Case 1, Motor C, small motor
The valid (n,T) points lie below the blue torque boundary.
The 436 W curve shows motor constant power loss.

Power Curve and efficiency contours for: Case 2, Motor C, small motor. Boundaries are in blue. Only (n,T) points below the blue torque boundary are allowed. The 436 W curve shows motor constant power loss.

MULTI-MOTOR SWITCHING SYSTEM AND METHOD FOR OPTIMIZED PERFORMANCE

CROSS-REFERENCE TO RELATED APPLICATIONS

This application claims priority to U.S. provisional patent application Ser. No. 62/881,759 filed Aug. 1, 2019, and U.S. provisional patent application Ser. No. 62/988,334 filed Mar. 11, 2020, the disclosures of which are hereby incorporated by reference as if fully set forth herein.

FIELD OF THE INVENTION

The inventive systems and methods herein relate generally to the field of multi-motor systems and multi-generator systems. More specifically, the inventive systems and methods described herein relate to multi-motor and multi-generator systems including controllers and related components for providing optimized performance and efficiency.

BACKGROUND OF THE INVENTION

Systems and methods for controlling systems with multiple motors are known in the art. However, existing systems suffer from significant drawbacks that prevent them from operating in a truly optimized and efficient manner.

For example, many existing systems typically rely upon sequential local optimizations for a given point of time and a given set of current or instantaneous conditions to determine the load that each motor should receive. Such optimizations that are local to a given point in time-suffer from the fact that they do not take into account conditions and variables relating to an entire trip. As a result, these systems are incapable of providing for overall efficient allocation of loads across motors; for example, optimization at one operating point may lead to overheating at a later time. Moreover, to the extent existing multi-motor systems do take into account temperature, any consideration is generally limited to ensuring that motor temperatures stay within certain pre-defined ranges and, as such, is a localized binary decision. Furthermore, existing systems do not integrate the optimization of energy regeneration (i.e., braking) in the case of electric vehicles into their optimization solutions.

In addition, many of the methods and systems require a transmission to transfer the torque load between motors. These transmissions introduce mechanical losses into the system, and hinder efficient operation of a multi-motor system. It would be highly desirable to provide a multi-motor or generator system and method that provides for optimized performance while avoiding these major drawbacks.

SUMMARY OF THE INVENTION

Provided herein are a multi-component optimization control system and method that globally optimizes the distribution of torque loads across motors and generators. Taking into account the entire task (e.g., in the case of an electric vehicle information relating to the entire trip, including in some embodiments taking into account energy generation through braking), and constraints such as maintaining motor and generator temperatures below critical levels or within levels that would ensure efficient operation of the motor and overall system, the control system of the current invention is capable of providing a more efficient solution than systems which rely upon "local" optimization that are based on a snapshot of current conditions in time. In this way, the systems and methods of the current invention overcome the deficiencies of existing systems, which use pre-determined static efficiency curves or efficiency ranges that only examine a series of independent local decisions and do not consider constraints such as motor and generator temperatures other than in a binary, non-optimized manner.

In one embodiment, the optimization control system is a high-efficiency driving-motor system that optimizes the allocation of driving loads across multiple motors. In doing so, the system achieves an efficiency level that is greater than that of any individual motor within the system. The motor system disclosed herein is a multi-motor system controlled by a controller, in which the efficiency optimization is configured, in communication with multiple sensors providing inputs from which the controller may generate the necessary drive signals to the multiple motors in order to achieve efficient operation, particularly efficient operation in terms of energy consumption or regeneration (through braking) over an entire trip.

The optimization system disclosed herein can be adapted to existing motors, as well as newly designed motors. The existing or newly designed motors can be in the form of multiple discs on the same shaft (same speed), or in the form of entirely independent motors where each motor is independent of others such that they maintain their individual operating characteristics in terms of both torque and speed. In the latter form, gearing, such as differentials, allows the different motors to deliver torque to the wheels.

The motor optimization system is designed to control the contributions of multiple motors to driving a load in a system in a manner that results in optimized performance of the system. In one embodiment of the system, it reduces battery usage and the resultant energy losses by dynamically allocating driving tasks to multiple motors based on the efficiency level at each demand point of torque and power. The controller determines the torque percentage of each of the motors in the system while obtaining the objective of minimizing the battery usage subject to the real-time driving conditions and motor power curves and generates drive signals for the control of the motors accordingly. In other embodiments, the system is capable of controlling multiple motors in a system for purposes of meeting a performance objective other than increasing efficiency, such as maximizing acceleration or driving range, or a combination of performance objectives such as maximizing range given a minimum acceptable acceleration.

The controller of the system is adapted to conduct a global optimization in that it determines the most optimal distribution of motor loads (optimal in terms of maximizing energy efficiency, or other driving objective) over an entire trip (or driving cycle), as opposed to sequentially determining the optimized solution for a given point of time and for a given set of current conditions (i.e., local optimization) without considering the entire trip or driving cycle. In one embodiment where the control system provides for global optimization, the controller receives trip information (such as route, overall mileage, speed limit information, and trip time information) through a trip planning tool (such as a GPS-equipped device). This trip information may further include other trip factors and information provided by the trip planning tool such as the driving conditions (e.g., highway driving, city or "stop and go," hilly, flat, etc.), as well as information concerning environmental and weather information that might be provided by a weather application (e.g. temperature, humidity, wind strength and direction, etc.) in communication with the trip planning tool. The controller utilizes the trip information to generate a driving cycle and further incorporates this information into the optimization process performed by the controller to determine the optimal solution for the entire trip. In addition, the controller may use information provided by sensors on the vehicle such as ambient temperature, motor heat including internal motor temperature, shaft rotational speed, motor, motor current, and torque demand, in order to validate the global optimization. For any given moment, the solution from the global optimization is not necessarily more optimal than that from a local optimization. However, when the entire trip is considered, it is always true that global optimization is equal to or superior to the sum of multiple, sequential local optimizations.

In another embodiment, the optimization control system is applied to generators—either alone or in combination with multiple motors—resulting in a high-efficiency generator system that optimizes the allocation of available torque across multiple generators. In doing so, the system achieves an efficiency level that is greater than that of any individual generator within the system. In the generator system disclosed herein, the efficiency optimization performed by the controller is configured based on input from multiple sensors providing inputs and from which the controller may generate the necessary signals to the multiple generators in order to achieve efficient operation across an entire operating range.

The generator optimization system is designed to control the contributions of multiple generators in a system in a manner that results in optimized performance of the system. In one embodiment of the system, it maximizes current generation and the resultant energy conversion losses by dynamically allocating tasks to multiple generators based on the efficiency level at each point of available torque in a given cycle. The controller determines the available torque percentage of each of the generators in the system while maximizing current generation subject to real-time conditions. In other embodiments, the system is capable of controlling multiple generators in a system for purposes other than increasing efficiency.

These and other aspects and advantages will become apparent to those of ordinary skill in the art by reading the following detailed description, with reference where appropriate to the accompanying drawings. Further, it should be understood that the foregoing summary is merely illustrative and is not intended to limit in any manner the scope or range of equivalents to which the appended claims are lawfully entitled.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is described below in connection with the following illustrative figures, wherein.

DETAILED DESCRIPTION

Figure 1:
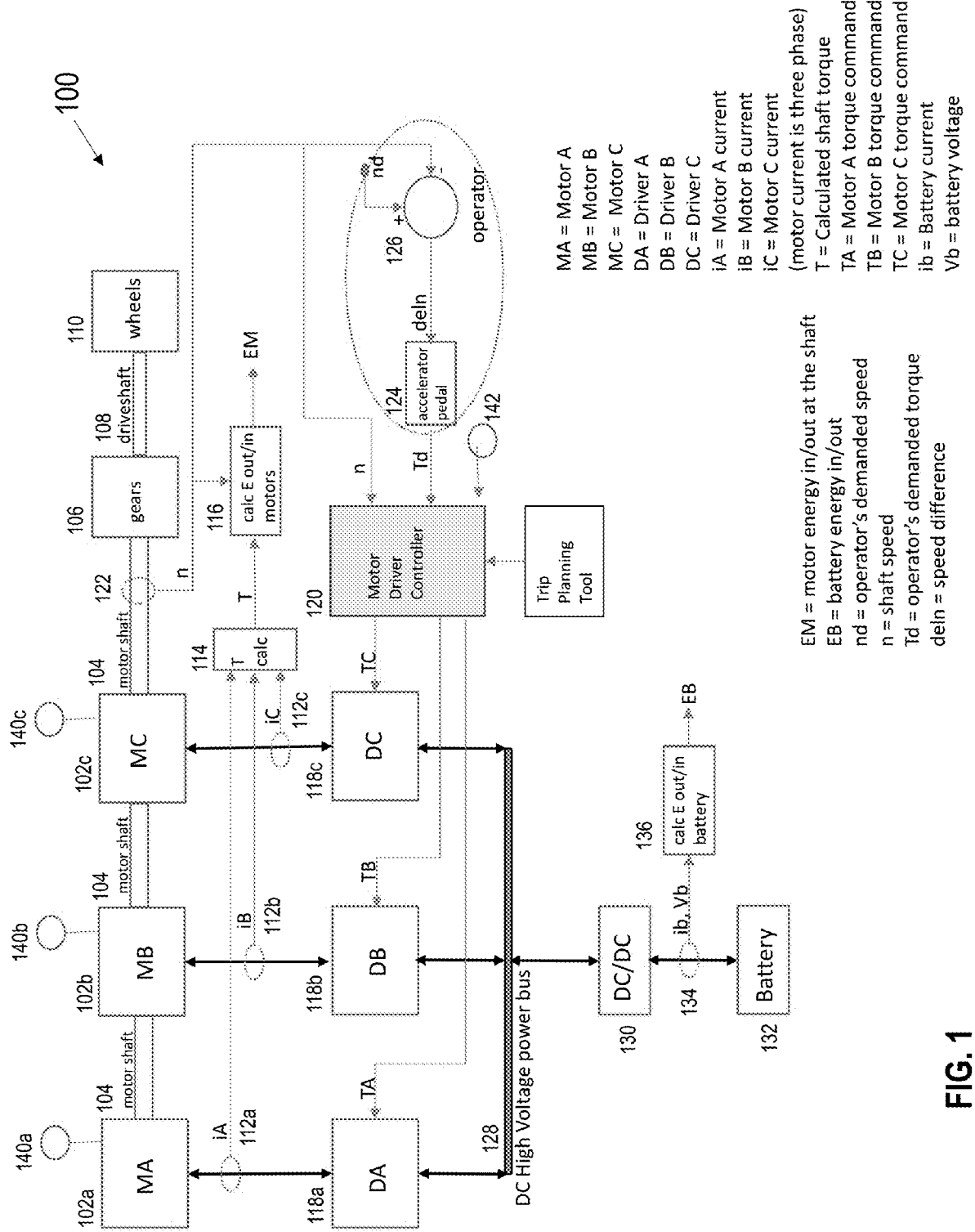
FIG. 1 is a top-level block diagram of a multi-motor system used for a vehicle, according to one embodiment of the invention.

While the present invention is capable of being embodied in various forms, for simplicity and illustrative purposes, the principles of the invention are described by referring to several embodiments thereof. It is understood, however, that the present disclosure is to be considered as an illustrative example of the claimed subject matter and is not intended to limit the appended claims to the specific embodiments illustrated. It will be apparent to one of ordinary skill in the art that the invention may be practiced without limitation to these specific details. In other instances, well-known methods and structures have not been described in detail so as not to unnecessarily obscure the invention.

The multi-motor switching system disclosed herein can be adapted to optimize the performance of any system where a load is driven by electric motors. For purposes of illustration, several of the embodiments discussed herein describe a multi-motor switching system that is incorporated into a vehicle such that the load is the driveshaft and wheels of a vehicle. It will be readily appreciated that the multi-motor system described herein can be adapted to a variety of other systems in which multiple motors can be used to drive a load.

In addition, the multi-motor switching system disclosed herein can be used with any type of electric motor. For purposes of illustration, several of the embodiments discussed herein describe the use of DC motors. It will be readily appreciated that AC motors, or other types of electric motors, may be used in the multi-motor system described herein.

In addition, multi-motor switching system disclosed herein can be used to control the contribution of motors to driving load to achieve desired levels of system performance for a variety of criteria of performance objectives. For purposes of illustration, several of the embodiments discussed herein are generally directed to controlling the contribution of motors to achieve the greatest efficiency and the lowest amount of power consumed. It will be readily appreciated that the system disclosed herein can optimize other criteria or performance objectives, such as maximum range or greatest acceleration, or combination of criteria or performance objectives such as the greatest range given a minimum required level of acceleration. It will also be appreciated that the system disclosed herein can control the contribution of motors to achieve a given threshold, such as a target efficiency (or target average energy consumption) that may be equal to or less than the greatest possible efficiency of the system, or to ensure a performance objective is met within the boundaries of one or more constraints, such as motor temperature, overall time, and/or maximum acceleration.

In addition, in many of the embodiments disclosed herein the number and types of motors are assumed to have been determined a priori. It will be readily appreciated that the methods and processes described herein for selecting the optimal contribution of motors to achieve a certain criteria can be used to determine which motors to include in a multi-motor switching system, including based on factors relating to observed driving patterns (such as driving behavior, common road conditions, and common trip characteristics) of a motorist, and the performance and efficiency of the motors, while controlling for other factors such as cost, size, and other characteristics of motors. Accordingly, the methods and systems described herein can select a subset of motors out of a larger set of motors or creates a group of motors to best meet a given motorist's driving objective.

Description of Embodiment of Overall System

The controller determines the torque percentage of motors in order to supply the necessary output. As further described herein, the system described herein determines the torque percentage of each of the motors while minimizing battery usage, subject to the requirements of driving cycles and motor power curves. For example, in a system having three motors, the system operates such that one motor, two motors, or each of the three motors contribute(s) a torque percentage that provides minimized battery usage, subject to the requirements of the driving cycle and the power curves of the three small motors.

FIG. 1 is a top-level block diagram of a multi-motor system used for a vehicle, according to one embodiment of the invention. The multi-motor system functions to optimize the performance of a given set of motors to achieve the highest efficiency for a given requirement of speed and torque by the operator of a multi-motor vehicle.

The multi-motor system has three motors 102*a*, 102*b*, 102*c* designated MA, MB, MC that drive the same motor shaft 104 which is connected into a gear system 106. The gear system transfers power from the motors, conveyed via the motor shaft, into a driveshaft 108 that powers the wheels 110 of the vehicle. Although the system shown has three motors, the system may include two, three, or more motors.

Each motor 102*a*, 102*b*, 102*c* is coupled to a respective driver 118*a*, 118*b*, 118*c*. The drivers are in turn coupled to a high-voltage power bus 128 that connects the drivers to a voltage converter 130. In the embodiment shown in FIG. 1, the motors are DC motors and therefore the converter is a DC/DC converter and the high-voltage power bus is a DC high voltage power bus. In other embodiments in which the motors are AC motors, the system components are adapted for AC power including through the use of an AC/DC converter and an AC high voltage power bus. The voltage converter 130 is coupled to a source of rechargeable power in the form of a battery or group of batteries 132. Power in the system travels in both directions with respect to the motors and the battery: power is supplied by the battery 132 to the motors 102*a*, 102*b*, 102*c* to drive the motor shaft and the driveshaft, and power generated by the motors 102*a*, 102*b*, 102*c* through braking or from free rotation of the motor shaft with respect to the coils of the motors is supplied to the battery 132.

In supplying power from the battery 132 to the motors, the voltage converter 130 converts the voltage of the power from the battery 132 to a level suitable for the drivers 118*a*, 118*b*, 118*c* and supplies the converted voltage and power from the battery 132 to the drivers via the power bus 128. The drivers 118*a*, 118*b*, 118*c* then selectively supply current to drive the respective motors 102*a*, 102*b*, 102*c*.

In providing power from the motors to the battery, current generated by the motors 102*a*, 102*b*, 102*c* is provided to the respective drivers 118*a*, 118*b*, 118*c*. The respective drivers 118*a*, 118*b*, 118*c* transfer the power from this current onto the high voltage power bus 128 which is converted by the converter 130 to a voltage level that is suitable for recharging the battery 132. In one embodiment, the controller also utilizes efficiency maps of the motors with respect to energy generation in order to determine the torque load provided to each motor for purposes of achieving optimal energy generation.

A system operator 126, such as a driver of the vehicle, provides input in the form of demands for increased speed or torque, Td, such as via an accelerator pedal 124, as well as input in the form of decreased speed, such as via a brake pedal. In this way, it can be said that the operator 126 serves to input into the system information relating to the driving cycle for the vehicle. During operation of the vehicle, the operator will indicate a demanded speed via the accelerator pedal 124, where the demanded speed corresponds to a point in the driving cycle. If the vehicle speed provided does not equal the demanded speed, the operator inputs a demand for increased speed which corresponds to a demand for increased torque from the motors.

In one embodiment, the system includes multiple sensors that enable it to determine how to process a demand from the operator for increased speed and torque. A motor shaft sensor 122 measures and reports the speed of the motor shaft, n. The system also includes current sensors 112*a*, 112*b*, 112*c* that measure and report the amount of current iA, iB, iC delivered to the respective motors 102*a*, 102*b*, 102*c*. A torque monitor 114 reads the sensed motor currents iA, iB, iC and uses this information to calculate the torque of the motors. An energy monitor 116 reads the calculated torque from the torque monitor 114 and the motor shaft speed, n, and calculates the amount of energy, EM, that is either being delivered to, or alternatively generated by, the motors. The system further includes a current sensor and voltage sensor 134 that determines the amount of current ib and voltage Vb being provided to or supplied by the battery 132. The speed of the motor shaft, n, and the energy to/from the motors, EM, are sent to a controller 120 along with the demanded torque Td. The system also includes motor temperature sensors

140a, 140b, 140c associated with each motor, which provide the temperature, T', for each motor. In addition the system measures the ambient temperature $T_a'$, through ambient temperature sensor 142. The information gathered from these system sensors are used as inputs for a variety of system functions. In one embodiment, the controller 120 generates torque commands TA, TB, TC for each motor that are sent to motor drivers 118a, 118b, 118c, based on the measured motor shaft speed and given torque demand, taking into account temperature gradients and the effects on motor efficiency. In another embodiment, the controller uses information collected, including the measured motor shaft speed and given torque demand and other measured conditions, and provides feedback to a vehicle operator regarding deviations from optimal conditions and suggestions to the vehicle operator regarding modifications to driving behavior in order to meet a driving objective more optimally. In another embodiment, the information collected is used to determining driving patterns of an individual user, and to create driving pattern data.

Controller Operation and Motor Load Optimization

The controller 120 optimizes the torque commands to each motor in order to minimize the energy out of the battery. FIG. 2a is a block diagram illustrating the operation of the controller 120 and the process by which it optimizes the torque commands TA, TB, TC for each motor, according to one embodiment of the invention. As noted above, the controller 120 continuously receives the speed of the motor shaft, n, and the current torque demand, Td, from the operator as required by the given operating point in the driving cycle. At step 202, the controller also retrieves from a database 204 motor data, including efficiency data, etaA, etaB, etaC, that corresponds to the efficiency of the each of the motors in the system. The efficiency data for each motor represents the efficiency of that motor across possible combinations of speed and torque, including efficiencies across different operating temperatures. FIGS. 6-9 provide examples of efficiency data for various large and small motors. The motor efficiency data also includes boundary parameters for torque, power and temperature, which can be derived from the specifications of a motor. The motor data stored in the database 204 may also include other information relating to the operation and characteristics of the motors, including the operating temperature boundaries for the motors; thermal response parameters for each motor in the system (i.e., Motors A, B, and C), such as the thermal conductivity of the motor steel and other factors relating to heat generation and dissipation by the motors; and initial motor model resistances for each motor in the system.

Figure 2:
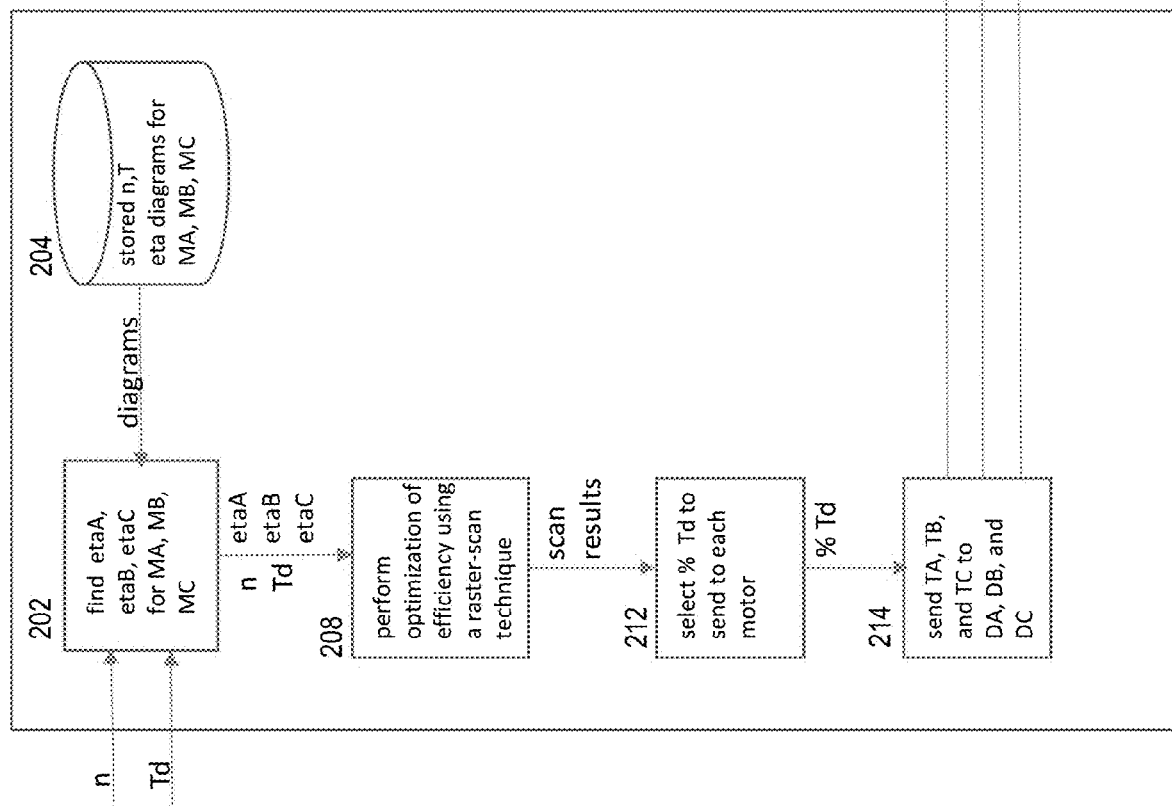
FIG. 2 is a block diagram illustrating the operation of the controller and the process by which it optimizes the torque commands for each motor, according to an embodiment of the invention.

FIG. 2 is a block diagram illustrating the operation of the controller 120 and the process by which it optimizes the torque commands TA, TB, TC for each motor, according to one embodiment of the invention. After retrieving the motor efficiency data, the controller proceeds to steps 208 and 212 to perform an analysis of the motor efficiency information to determine the optimal contribution of each motor in order to provide for the least amount of energy usage from the battery. To perform this optimization, the controller performs a raster-scan technique and then determines the optimum portions or percentages of the torque demand, Td, to be provided by each of the individual motors. The result of the controller analysis and output may be to drive one, two, or all three motors to have a contribution to servicing the torque demand at a particular operating point in the driving cycle. At step 214, the controller generates motor torque command signals, TA, TB, TC, for the respective motor drivers 118a, 188b, 118c corresponding to the portions or percentages of the overall torque demand, Td, determined by the optimization analysis. For example, if it is determined based on the motor efficiency data and the current speed and torque demand that the most efficient energy usage would result from Motor A supplying 20% of the torque demand, Motor B supplying 30% of the torque demand, and Motor C supplying 50% of the torque demand, then the controller would output motor torque command signals TA, TB, TC to the respective motor drivers, such that TA equals 20% of Td, TB equals 30% of Td, and TC equals 50% of Td; or if it is determined the most efficient energy usage would result from Motor A supplying 100% of the torque demand, and from Motor B and Motor C supplying 0% each, then the controller would output motor torque command signals TA, TB, TC to the respective motor drivers, such that TA equals 100% of Td, TB and TC equals 0% of Td; or for another solution it is possible that TA equals 50% of Td, TB equals 50% of Td and TC equals 0% of Td.

Operation of the controller 120 occurs in or near real-time throughout the driving cycle, such that the controller continuously adjusts the motor torque command signals based on changes in the torque demand and the speed of the vehicle. In particular, the controller continuously steps through the process described in connection with FIG. 2 throughout operation of the vehicle, either at fixed intervals or in a continuous loop of operation. Because this analysis occurs in or near real-time, the processor of the controller ideally has sufficient speed and bandwidth to perform the optimization calculations (e.g., the raster scan analysis) in steps 208 and 212 on a real-time or near real-time basis.

In another embodiment, the controller alternatively or additionally generates motor torque command signals based on non-real-time decisions, such as through the use of pre-loaded rules. In one such embodiment, the pre-loaded rules are determined based on previously performed optimization calculations based on the motor characteristics and a given a set of variables. For example, optimization calculations may be performed separately and used to determine ahead of time the optimal motor torque commands to meet a given requirement (or combination of requirements) across a set of possible combinations of torque demand and shaft speed (based on the characteristics of the motors, such as their efficiency data). The results of these optimization calculations are then used to build a lookup table that is stored in a memory accessible by the controller, such as memory 204. During operation, at steps 208 and 212 the controller would then consult the lookup table using the given torque demand and shaft speed and determine the associated motor torque command having been previously calculated as being optimized for the requirement or combination of requirements, including ensuring that temperature constraints are met. In one embodiment, based on the driving pattern data and the driver's objective (such as maximizing the driving range or minimizing the driving time), the controller can make suggestions to an operator regarding modifying the operator's driving behavior in order to meet the driving objective more optimally.

In another embodiment, the controller alternatively or additionally uses heuristic methods to determine a sub-optimal but sufficient contribution of each motor in order to meet a requirement or set of requirements. For example, in one such alternative embodiment in step 208 of FIG. 2a and FIG. 2b the controller employs a heuristic method to determine a sub-optimal but sufficient division of the torque demand among the motors to provide for minimal energy usage from the battery. By employing heuristic methods and determining a sub-optimal solution, the controller is able to perform operations more quickly while still determining a division of load sharing among the motors that is sufficient for a given requirement or set of requirements (minimizing energy usage, maximizing range, etc.).

Figure 3:
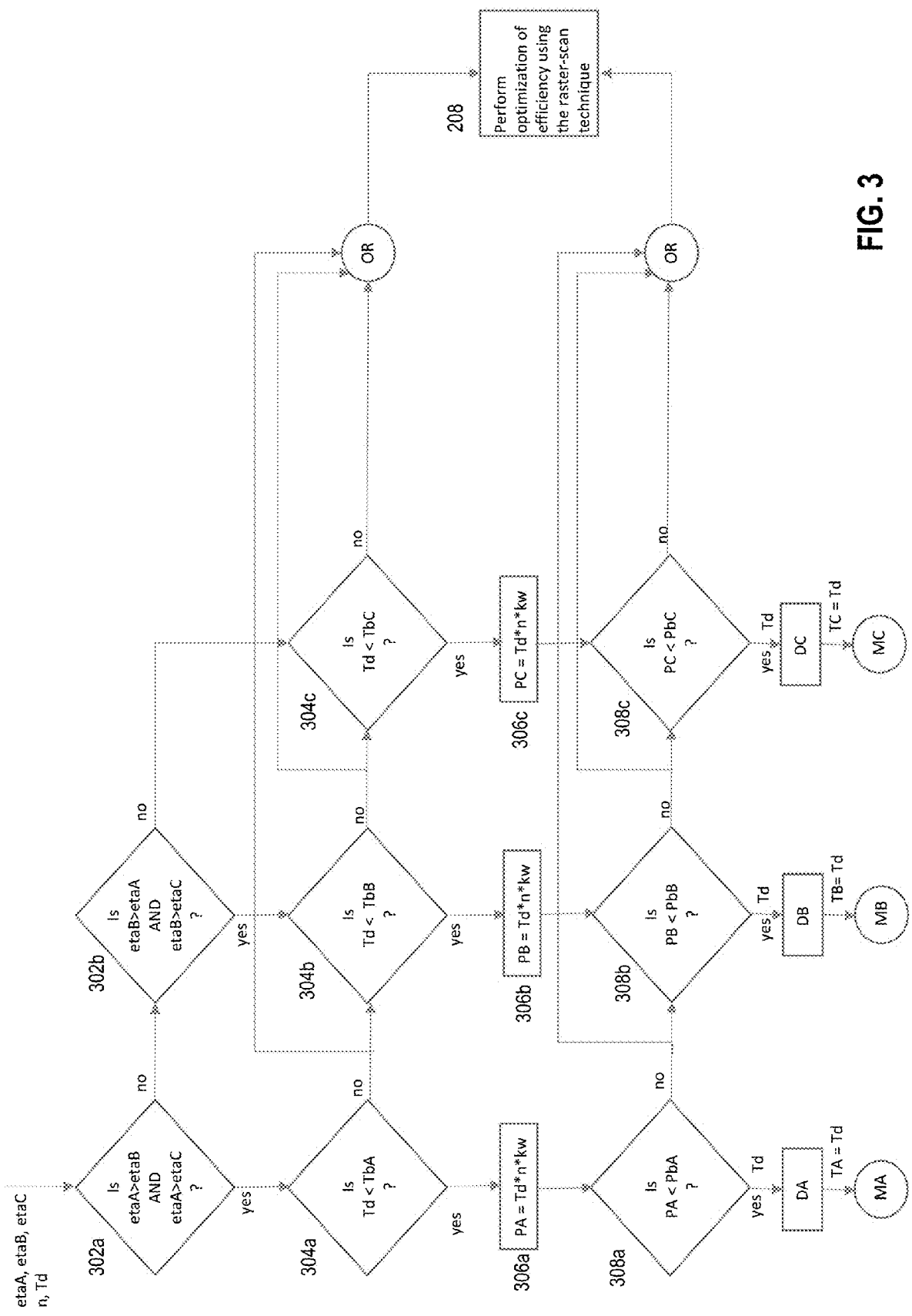
FIG. 3 is a block diagram showing the steps taken by the controller in connection with the processes relating to determination of the motor torque command signals, according to an embodiment of the invention.

FIG. 3 is a block diagram showing the steps taken by the controller relating to the determination of the motor torque command signals according to an embodiment of the invention. First, the controller compares the relative efficiencies of each motor at the given speed and torque (n,T) for the operating point in the driving cycle, and determines the motor with the greatest efficiency at that point. For a system with three motors this comparison and determination includes steps 302a and 302b, wherein each motor's efficiency is compared to that of each other motor in the system. More specifically, in step 302a the efficiency of Motor A, etaA, is compared to the efficiencies of Motors B and C, etaB and etaC, to determine if it is greater. Similarly, in step 302b, the efficiency of Motor B, etaB, is compared to the efficiencies of Motors A and C, etaA and etaC, to see if it is greater. For systems with greater numbers of motors, the controller would undertake additional similar comparison steps to determine the motor with the greatest efficiency. Alternatively, the controller may use other algorithms to determine which motor has the greatest efficiency for two, three, or more motors.

Once the motor with the greatest efficiency is found, the controller tests a first condition and checks the torque level to determine if the torque requirement, Td, is greater than the torque boundary of the motor with the greatest efficiency. With reference to FIG. 3, at steps 304a, 304b, and 304c, the controller compares the torque demand, Td, to the torque boundary of the motor determined in the prior step to have had the greatest efficiency at the given speed and torque in the driving cycle. For example, if it is determined through steps 302a and 302b that Motor B has the greatest of the motor efficiencies at the given point in the driving cycle, then at step 304b the torque demand, Td, is compared to the torque boundary for Motor B, TbB, to determine if it exceeds that boundary. If the torque demand exceeds the torque boundary of the motor with the greatest efficiency, then that motor alone cannot satisfy the particular torque demand and the controller implements sharing of the torque demand load across multiple motors. As a result, the controller proceeds to step 208 for implementing the multi-motor optimization analysis.

If, however, the torque demand does not exceed the torque boundary such that the torque boundary is satisfied, then the controller tests a second condition and determines whether the motor can supply the requisite power or whether the motor power boundary is exceeded. At steps 306a, 306b, and 306c, the required motor power is calculated for the motor with the greatest efficiency at the given point in the driving cycle. The motor power is calculated as a product of the torque demand (e.g., in Newton-meters (Nm)) and motor shaft speed (e.g., in revolutions-per-minute (rpm)). After the required motor power is calculated, then at steps 308a, 308b, and 308c, the controller compares the motor power to the power boundary of the relevant motor to determine whether it exceeds the power boundary of that motor. For example, if it is determined through the preceding steps 302a and 302c that Motor C has the greatest of the motor efficiencies at the given point in the driving cycle, and it is further determined at step 304c that the torque demand Td does not exceed the torque boundary for Motor C, TbC, then the controller compares the required motor power PC to the power boundary for Motor C, PbC. If the required motor power exceeds the power boundary of the relevant motor, then it is also determined that the motor alone cannot satisfy the particular power demand and the controller implements sharing of the torque demand load across multiple motors. As a result, the controller proceeds to step 208 for implementing the multi-motor optimization analysis.

If, however, the two conditions are satisfied and the torque demand and the required power do not exceed the motor boundaries, then the controller sends the torque demand directly to the motor determined to have the greatest efficiency at the given motor shaft speed and torque (n,T) for the driving cycle, and does so by setting the motor torque command for that motor to be the entire torque demand Td. For example, if it determined through steps 302a that Motor A has the greatest efficiency of the motors, and if it is determined at step 304a that the torque boundary condition for Motor A is satisfied, and if it is then determined through steps 306a and 308a that the power boundary condition for Motor A is satisfied, then the controller generates a Motor A torque command, TA, equal to the entire torque demand Td. If, however, either the torque boundary condition or the power boundary condition is not met, then the controller switches to multi-motor operation such that the torque demand is shared across more than one motor, and the controller implements the multi-motor optimization analysis.

Figure 4:
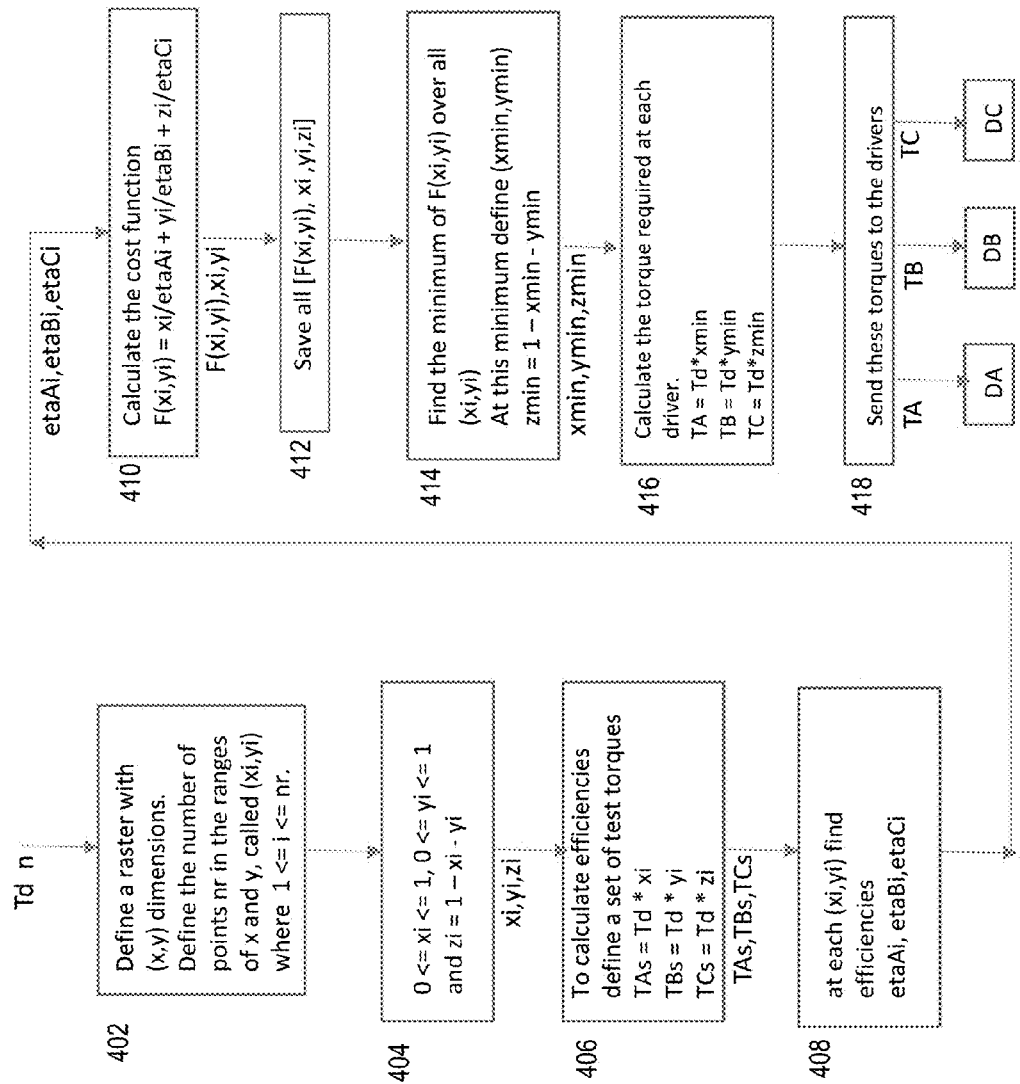
FIG. 4 is a block diagram illustrating the raster scan technique used to determine the load sharing among motors to optimize efficiency for a given shaft speed and torque, according to an embodiment of the invention.
Figure 5:
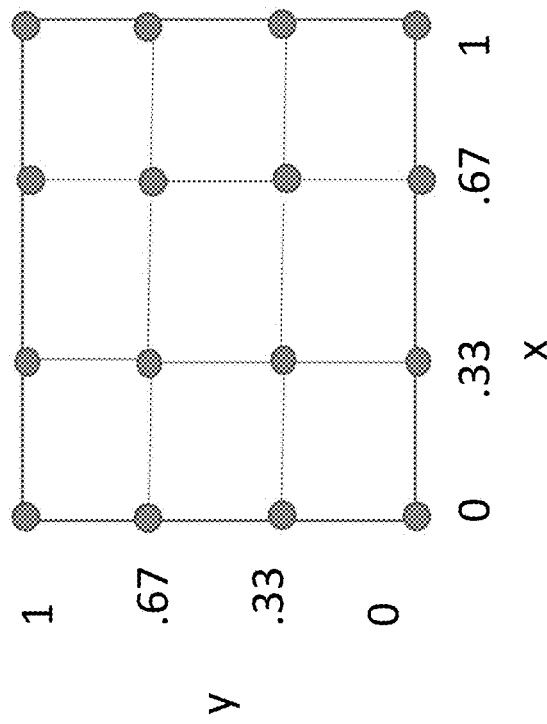
FIG. 5 shows an illustrative 4×4 raster in a two-dimensional space such that three variables can be optimized (as in the case of optimizing load sharing across three motors), according to an embodiment of the invention.

FIG. 4 is a block diagram illustrating a raster scan technique used to determine the load sharing among motors to optimize efficiency for a given shaft speed and torque at an operating point in the driving cycle. As noted above, the controller receives a motor speed, n, and a torque demand, Td, at a given operating point in the driving cycle. When the controller determines that the load sharing among multiple motors is required, then the controller implements the following raster scan technique to determine the percentage of the torque demand that each motor will provide, such that the combined motor torque demands sent by the controller to the motor drivers equal the total torque demand. For example, in the system shown with three motors, for a given torque demand, Td, the controller 120 generates motor torque commands TA, TB, TC, such that TA=Td*x, TB=Td*y, and TC=Td*z, where 0<=x<=1, 0 y<=1, 0<=z<=1 and 1=x+y+z. In performing the raster scan analysis, at steps 402 and 404 the controller first defines a raster in an m-dimensional space, where m is equal to one less than the number of motors. In addition, the controller defines the raster to have a defined number of points, or intervals, in each dimension of the m-dimensional space, where the number of intervals corresponds to the level of accuracy desired for the optimization calculation such that more intervals result in greater accuracy. By way of illustrative example only, FIG. 5 shows a 4×4 raster in a two-dimensional space such that three variables can be optimized (as in the case of optimizing load sharing across three motors). In the example shown, the raster of 4×4 points in the two-dimensional space is defined with regular intervals such that x and y may each assume the values 0, 0.333, 0.667, and 1. At each point, the value of z is known to be z=1−x−y. At step 406, a set of test torques is defined for each of the motors, wherein the test torque at each point is equal to a product of the torque demand and the value in the raster corresponding to a particular motor. In the example shown in FIG. 4, the value of x in the x-dimension corresponds to the percentage of the torque demand assigned to Motor A (TA), the value of y in the y-dimension corresponds to the percentage of the torque demand assigned to Motor B (TB), and the value of z (defined by x and y) corresponds to the percentage of the torque demand assigned to Motor C (TC), such that TA=Td*x, TB=Td*y, and TC=Td*z. At step 408, the efficiencies for the motors is calculated for each point in the raster scan based on the stored efficiency data for each motor. At step 410 a cost function is calculated at each point in the raster scan inputting the efficiencies calculated at step 408. The cost function is derived from the minimum battery energy at that point in time. For the raster scan for a three motor system, the cost function takes the form of F(x,y)=x/etaA+y/etaB+z/etaC. At steps 412 and 414, the controller determines the minimum cost function, Fmin, across each of the calculated cost functions, and identifies the point in the raster scan where the minimum cost function occurs. This point corresponds to the percentage of torque demand to be assigned to each motor to provide the most efficient operation of the system. In the case of three motors, the minimum cost function, Fmin, occurs at the point (xmin, ymin, zmin). At step 416, the torque commands for each motor are calculated based on the minimum values calculated in steps 412 and 414, such that each motor is assigned a torque corresponding to the product of the torque demand and the point of the minimum cost function, Fmin, corresponding to that motor in the raster. For example, in the case of three motors, the calculated torque commands are calculated by the controller as follows: TA=Td*xmin, TB=Td*ymin, and TC=Td*zmin. At step 418, the calculated torque commands are sent to the respective drivers.

The controller 120 can implement the raster scan technique to optimize for two, three or more motors. For a relatively large numbers of motors, the controller may utilize other techniques to determine the optimal load sharing among motors, such as the method of steepest descent which uses the gradient of the cost function. For example, where more than five motors are utilized the controller may use a method of steepest decent to determine the optimal load sharing for a given driving condition. In other embodiments involving larger numbers of motors, the controller uses heuristic methods to determine a sub-optimal but sufficient contribution of each motor in order to meet a requirement or set of requirements. By employing heuristic methods instead of optimization techniques, the controller is able to generate torque commands in near real-time despite the added computational complexity at step 208 that comes with additional motors. In other embodiments involving larger numbers of motors, the controller generates motor torque command signals based on non-real-time decisions, such as through the use of pre-loaded rules determined based on prior optimization calculations given a set of variables.

In addition, although the above techniques are described as optimizing performance, it is understood that the same techniques can be used to determine load sharing that meets a desired threshold, rather than an optimal solution. For example, where a user has designated that the controller provide control of the load sharing between motors to provide for a particular range (e.g., 100 miles) the controller uses the analytical techniques above to determine which combinations of load-sharing between motors can provide the given range. From these combinations, the controller can use the same analytical techniques to determine which combination to use based on another metric, such as optimizing efficiency or meeting a minimum acceleration threshold.

Although the multi-motor optimization process has been described above with respect to the greatest efficiency and the least amount of energy usage from the battery, the controller 120 may optimize the torque load sharing among multiple motors based on a variety of factors. For example, the controller may alternatively or additionally optimize for maximum range or acceleration, or a combination of factors such as a minimum level of acceptable acceleration with the greatest range.

Global Optimization Including Environmental Variables and Temperature

The system 100 can also utilize environmental information to perform a global optimization over an entire driving cycle. Such global optimizations over an entire driving cycle can be performed based on the fact that operating points are correlated by the nature of the driving cycle, such that they are not independent. For example, real-world constraints and physical limitations on motors and the overall system, including limitations on acceleration, ensure that operating points cannot be too distant from each other (in terms of speed and torque) in a given driving cycle. To account for this relationship, at each operating point a new global optimization is performed considering all the past points and future points. The global optimization is more than just a sum of series point optimizations because it takes into account the effect that past operating points have on future operating points in the driving cycle. As one example, with the consideration of thermal transients, each operating point affects future operating points. In particular, heat does not dissipate immediately but rather may build over time, and this accumulation of heat based on past torque commands affects the distribution of torque among multiple motors to provide for optimal efficiency in the system and protects the future operating performance of the motors.

Figure 11:
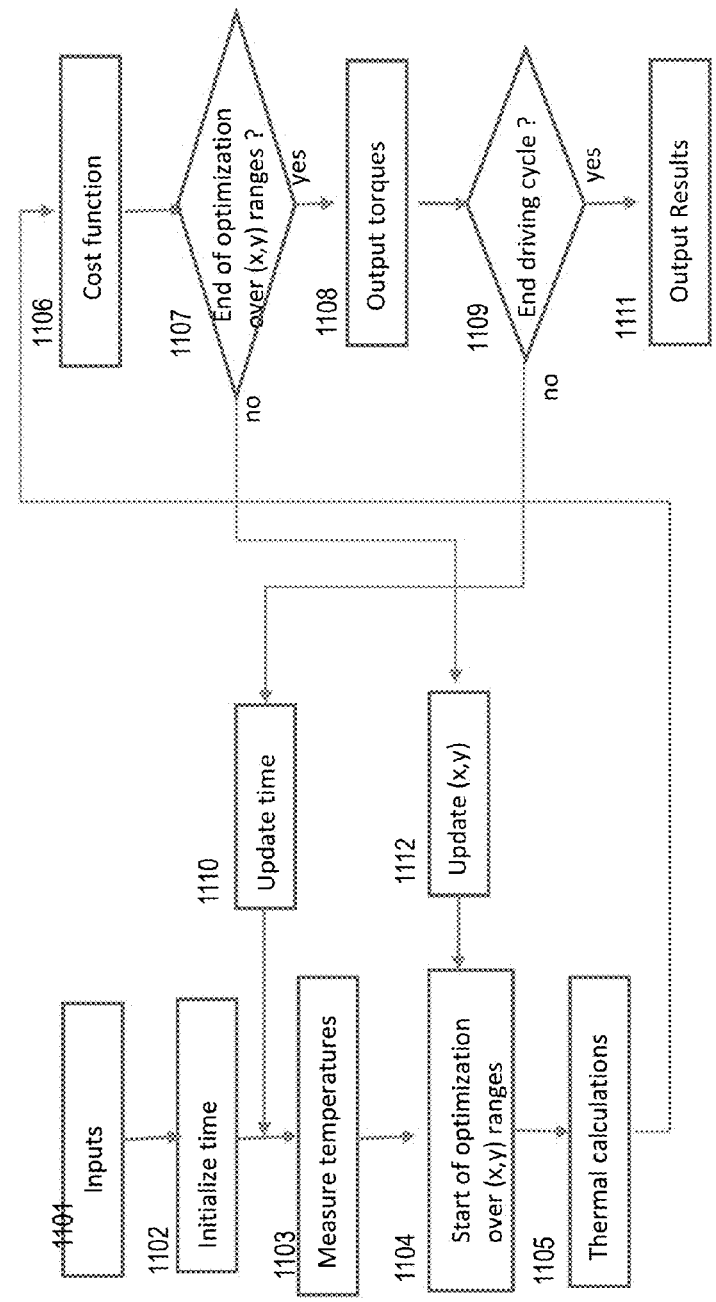
FIG. 11 is a block diagram illustrating the operation of the controller and the process by which it performs a global optimization of torque commands for each motor, according to an embodiment of the invention.

FIG. 11 is a block diagram illustrating the operation of the controller 120 and the process by which it performs a global optimization of torque commands for each motor in order to meet a particular performance objective, according to an embodiment of the invention. In the embodiment described herein, the performance objective is minimizing energy. However, as noted above, it will be appreciated that other performance objectives or combination of performance objectives may be used for the global optimization. It will also be appreciated that the global optimization can be performed to ensure a performance objective is met within the boundaries of one or more constraints, such as motor temperature, maximum time for the trip, maximum speed, and/or maximum acceleration.

As noted above, the global optimization takes into account the effect that past operating points have on future operating points in the driving cycle. In the example provided herein, the global optimization takes into account consideration of thermal transients. However, other transient variables and conditions that can affect motor efficiency and performance may be taken into account in addition to or in lieu of motor temperature.

At step 1101, the controller receives input information from various system components and initializes the variables that it will use to perform the global optimization. The controller receives the driving cycle information directly from the trip planning tool; alternatively, the trip planning tool provides the controller with trip information from which the controller determines the driving cycle information and other characteristics of the driving cycle. The controller then determines the speed and torque data ($n_{di}$, $T_{di}$) at times $t_i$=($t_0$, $t_1$, . . . , $t_f$) over the course of the driving cycle, where t is time, i is the index of the time step in the driving cycle data, $t_i$ is the time at the $i^{th}$ step in the driving cycle, and $t_i$=($t_0$, $t_1$, . . . , $t_f$) refers to the $i^{th}$ time step, to is the initial step time, and $t_f$ final step time.

In addition, the controller receives from the database 204 or other memory storage devices or inputs mechanical data relating to the vehicle, such as the air friction coefficient;

thermal response parameters for each motor k in the system (i.e., Motors A, B, and C), such as the thermal conductivity of the motor steel and other factors relating to heat generation and dissipation; initial motor model parameters $R_k(T'_{k0})$ for each motor kin the system; and electromechanical parameters of the motors, such as the motor bus voltage; and any temperature constraints or other constraints (such as maximum acceleration). These values are computed or measured in advance and stored in the database 204 for use by the controller in performing the global optimization. These values may also be measured and computed in real-time in order to provide feedback to the controller to be used to validate the global optimization performed by the controller.

At step 1102, the controller initializes the time variable. For example, the controller takes i=0, and sets t=$t_0$=0.

At step 1103, the controller also calculates the acceleration at the operating point in the driving cycle based on ($n_{di}$, $T_{di}$). In addition, the controller updates any transient variables that affect motor performance. In the embodiment shown, the controller updates the temperatures $T'_{ki}$ of each motor k at the $i^{th}$ step in the driving cycle. At time $t_0$=0, the motor temperature $T'_{ki}$ may be determined through motor temperature sensors 140a, 140b, 140c associated with each motor. Thereafter, the motor temperature $T'_{ki}$ is affected by the ambient temperature $T'_a$, (which is measured through ambient temperature sensor 142) as well as the internal motor heat generated and the heat dissipated. The motor temperature measurements $T'_{ki}$ and the ambient temperature measurements are provided to the controller.

At step 1104, the controller starts the optimization calculation. In the embodiment shown herein, the system starts the optimization using the raster scan technique disclosed herein over the range of x and y where $0 \le x \le 1$, $0 \le y \le 1$, $0 \le z \le 1$ and $1=x+y+z$, and where the value of x in the x-dimension corresponds to the percentage of the torque demand assigned to Motor A (TA), the value of y in the y-dimension corresponds to the percentage of the torque demand assigned to Motor B (TB), and the value of z (defined by x and y) corresponds to the percentage of the torque demand assigned to Motor C (TC). For systems with additional motors, additional dimensions are included in the raster scan process. At each value over the range of (x,y), the controller performs thermal calculations and determines a cost function, as further described below.

At step 1105, the controller performs thermal calculations to determine the change in temperature for the motor for a particular allocation of torque demand among the motors. The controller calculates a thermal transient to yield the simulated temperature $T'_{k(i+1)}$ at the end of the $i^{th}$ step after a period of time, $\Delta t$, for each motor k at $t_{i+1}$. For this calculation, the controller uses the motor thermal response parameters for each motor k which are retrieved from database 204.

At step 1106, the controller performs a cost function analysis for the particular allocation of torque demand among the motors with respect to the desired objective function. For each motor k the controller calculates $R_k(T'_{k(i+1)})$, a vector of motor parameters of the kth motor at temperature $T'_{k(i+1)}$ and $t_{(i+1)}$. For each motor k, the controller calculates $\eta_{k(i+1)}$, the efficiency of motor k, at the operating point ($n_{d(i+1)}$, $T_{d(i+1)}$) and time $t_{(i+1)}$. The controller then calculates a cost function $F_c(x_i,y_i)$ at the point of ($x_i,y_i$) relating to the performance criteria. In the embodiment shown, where the performance criteria is maximized for efficiency, the cost function is the amount of energy used.

At step 1107, the controller determines whether the optimization analysis has been performed over the entire range (x,y). If not, the value of x and y is updated at step 1112 such that the controller chooses the next value of x within the range of $0 \le x \le 1$, chooses the next y within the range of $0 \le y \le 1$, and calculate the next value of z where z=1−x−y; and then steps 1105 and 1106 are performed with respect to the updated values of x and y. Once the optimization analysis has been performed over the entire range (x,y), and cost functions have been derived for such points, the controller moves to step 1108.

At step 1108, the controller determines the results of the optimization analysis and outputs the resulting torque commands. The controller calculates $F_m$, the minimum of the cost functions $F_c(x,y)$, over the range of (x,y). The controller identifies the optimum (x,y)=($x_{opt}$,$y_{opt}$) corresponding to $F_m$. At time $t_{i+1}$, and using ($x_{opt}$,$y_{opt}$), the controller outputs the optimum torques to the motors. The controller then calculates battery energy consumed during $\Delta t = t_{i+1} - t_i$, and updates the total battery energy consumed so far over the period $0 \le t \le t_{i+1}$.

At step 1109, the controller determines whether the end of the driving cycle has been reached. The controller determines whether $t_{i+1} \ge t_f$. If the end of the driving cycle has not been reached, such that $t_{i+1} < t_f$, then at step 1110 the time variable is incremented such that $t_i$ increments to $t_{i+1}$ and i increments to i+1, and steps 1102 through 1108 are repeated based on the updated values of t and i. If the end of the driving cycle has been reached, such that $t_{i+1} \ge t_f$, the controller moves to step 1111.

At step 1111, the controller outputs the results of the global optimization calculation, such as the total battery power consumed for the driving cycle.

In one embodiment, over the course of the driving cycle and implementation of the torque commands generated by the global optimization, the controller uses current measurements from the sensors on the vehicle, such as ambient temperature, motor heat including internal motor temperature, shaft rotational speed, motor, motor current, and torque demand, in order to validate the global optimization.

In another embodiment, the controller continually performs the global optimization process over the course of the entire driving cycle, taking into account updated trip information, updated driving cycle characteristics, and updated measurements and calculations for variables, such as motor temperature, and ambient temperature.

Simulations of Multi-Motor System Operation Showing Increased Efficiency

The multi-motor system described above can apply to a variety of systems. For purposes of illustration, examples relating to use of the system in connection with an electric vehicle are provided. It will be understood that the multi-motor system and the controller therein can be applied to systems using electric motors to perform work.

Illustrative examples of the application of the system disclosed herein are provided in connection with simulated studies of the battery usage by sets of motors in a vehicle under different driving scenarios, represented by driving pattern data or "driving cycles." The specific motors and driving cycles are described in the following sections.

In the illustrative examples, load sharing across motors is determined by the controller in accordance with the optimization routine described herein. The battery output is the energy usage. The increased efficiency of the system disclosed herein is shown by comparisons to the battery usage to a system without load sharing across motors.

In the simulated testing described below, two cases of motors are explored for each of large motors and small motors, where the different cases (Case 1 and Case 2) correspond to sets of motors having different characteristics.

Tested Motors

Simulated testing of the system was carried out in connection with both large and small motors. Each motor within the system has a distinctive power curve. For purposes of testing, both large and small motors are represented by similar models, including the same resistances. In the examples provided, resistor matrices are used to define the motor circuit models. The circuit model parameters are the same for the larger motors and the smaller motors.

Figure 6A:
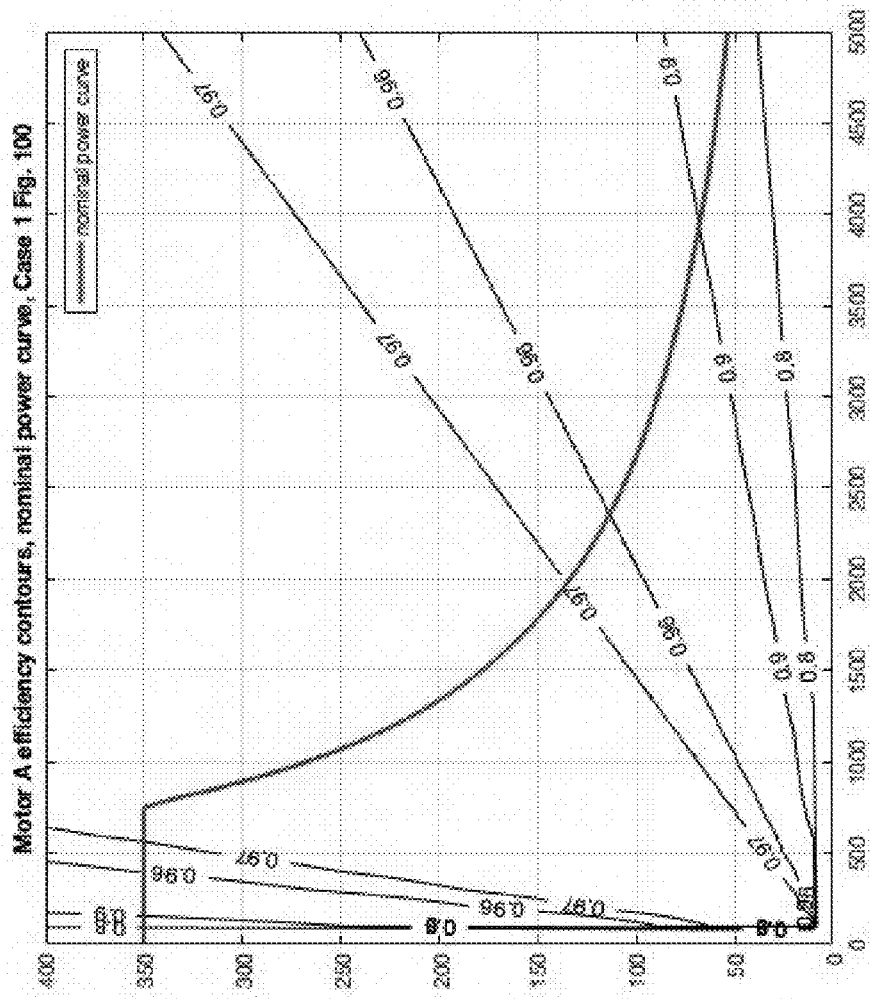
FIGS. 6a-c shows the power curve and efficiency contours for the three large motors of the Case 1 illustrative example of the operation of the multi-motor system, according to an embodiment of the invention.
Figure 6B:
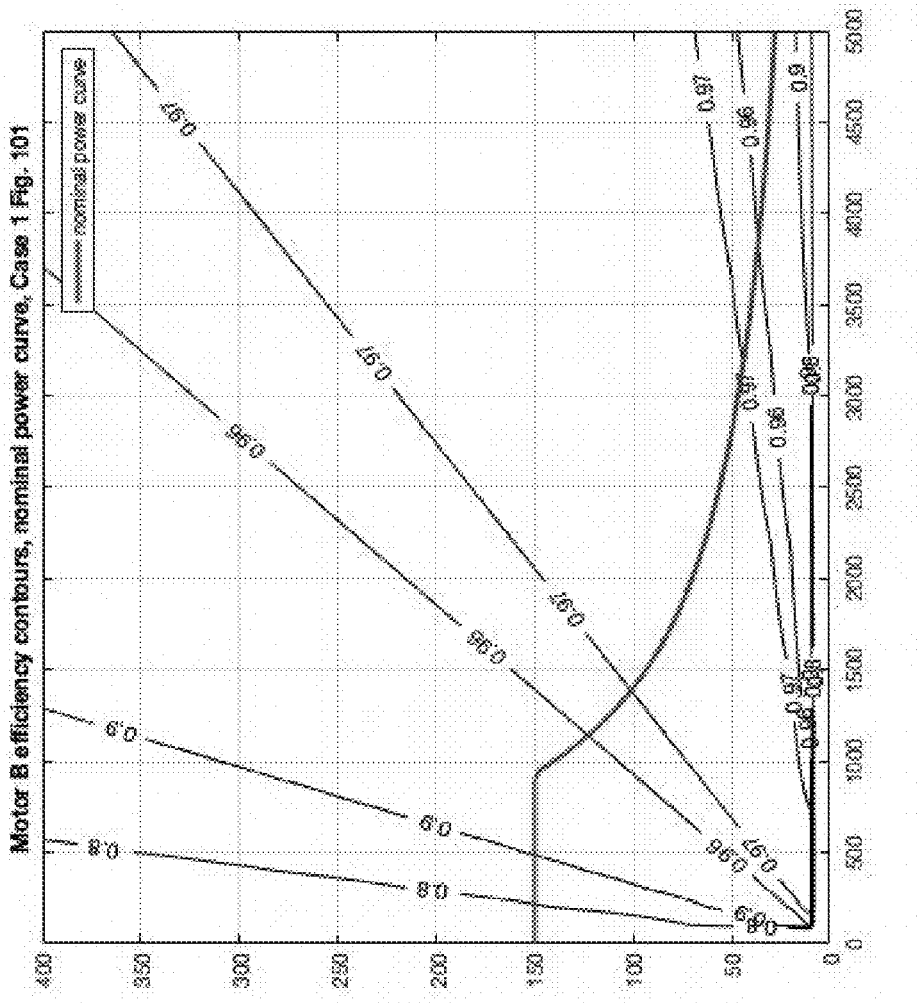
Figure 6C:
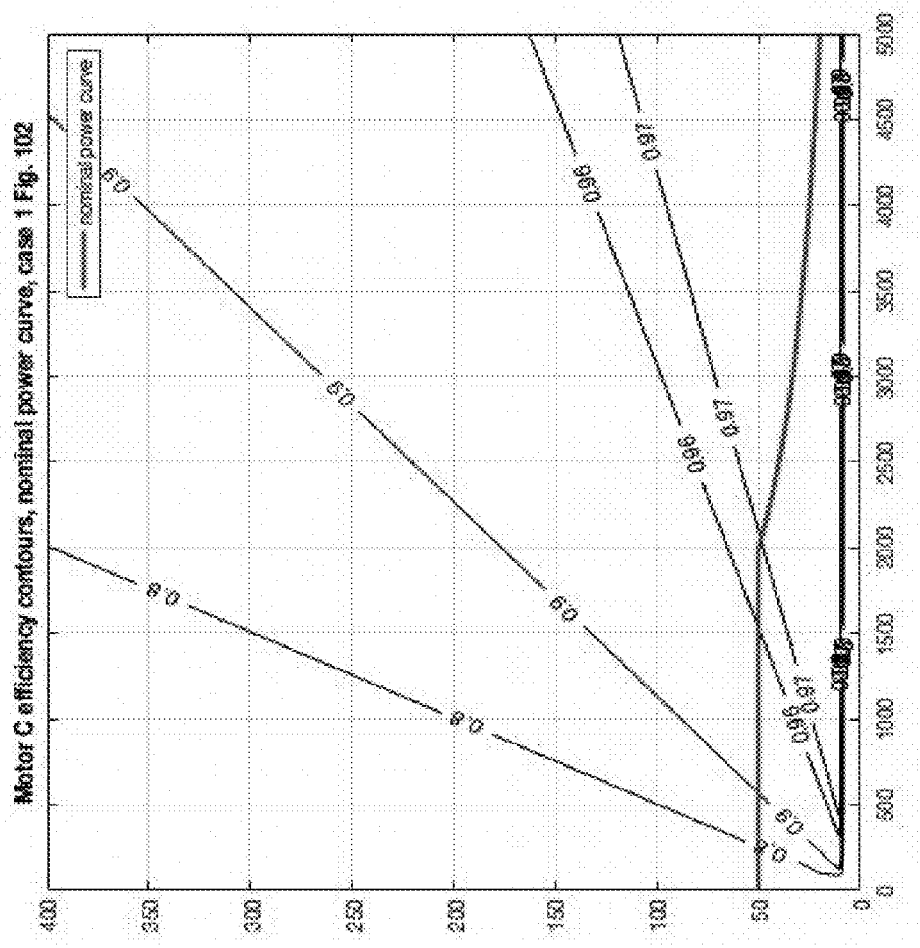
Figure 7A:
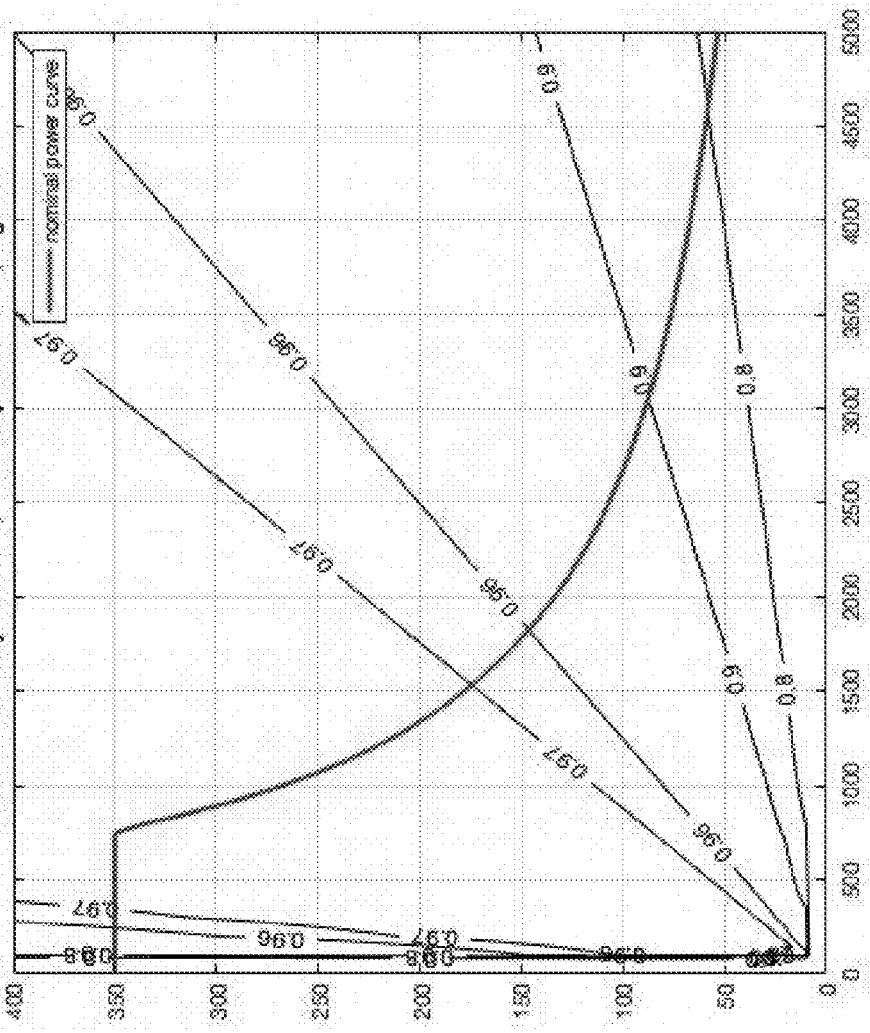
FIGS. 7a-c shows the power curve and efficiency contours for the three large motors of the Case 2 illustrative example of the operation of the multi-motor system, according to an embodiment of the invention.
Figure 7B:
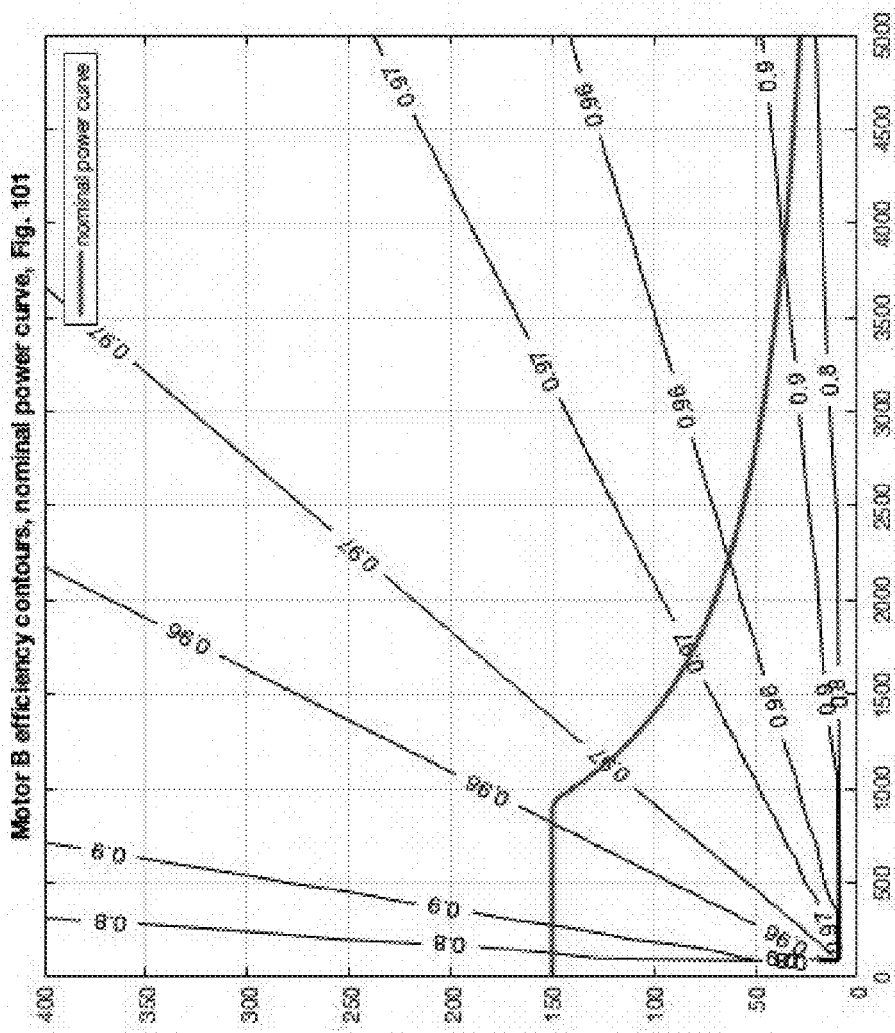
Figure 7C:
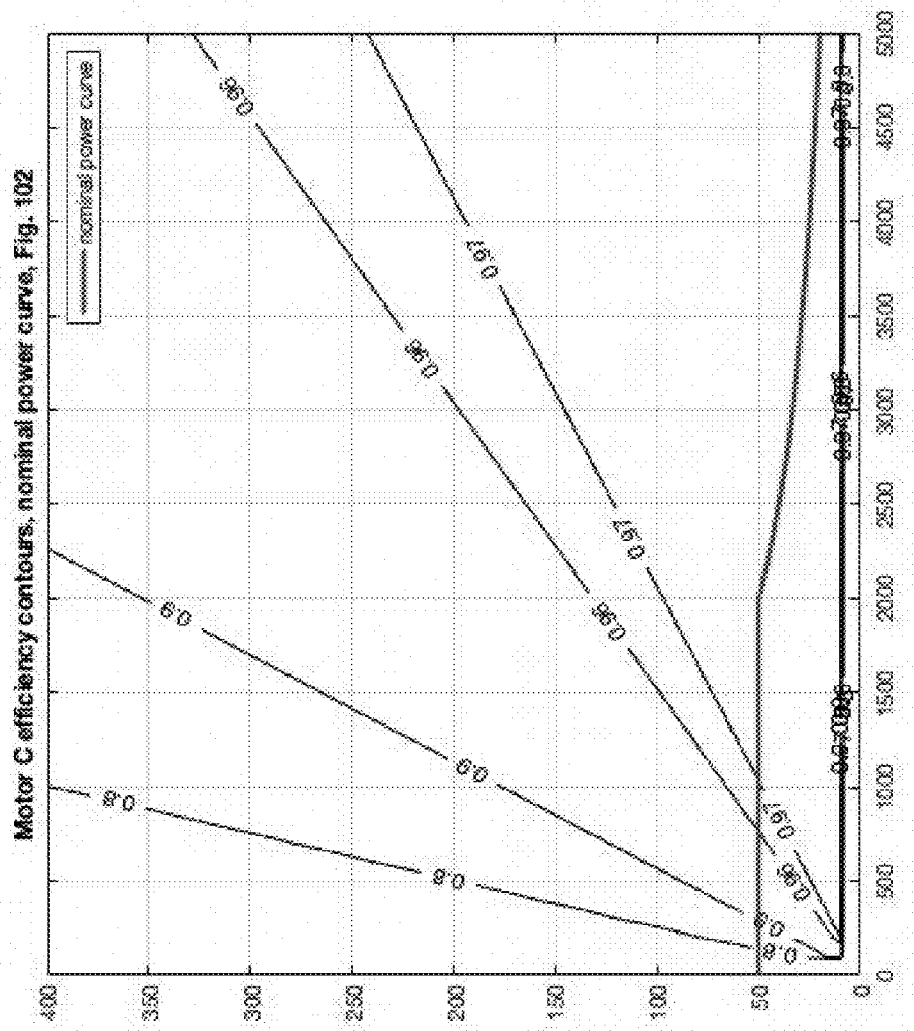
Figure 8A:
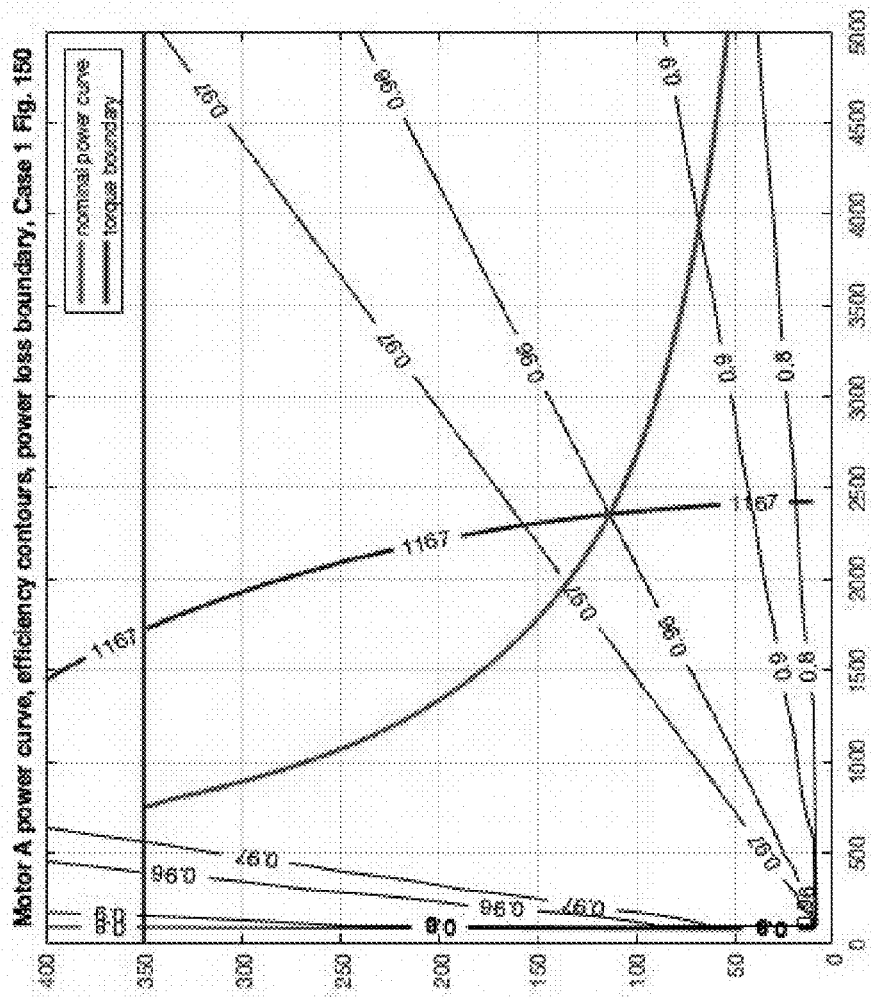
FIGS. 8a-c shows the power curve and efficiency contours for the three small motors of the Case 1 illustrative example of the operation of the multi-motor system, according to an embodiment of the invention.
Figure 8B:
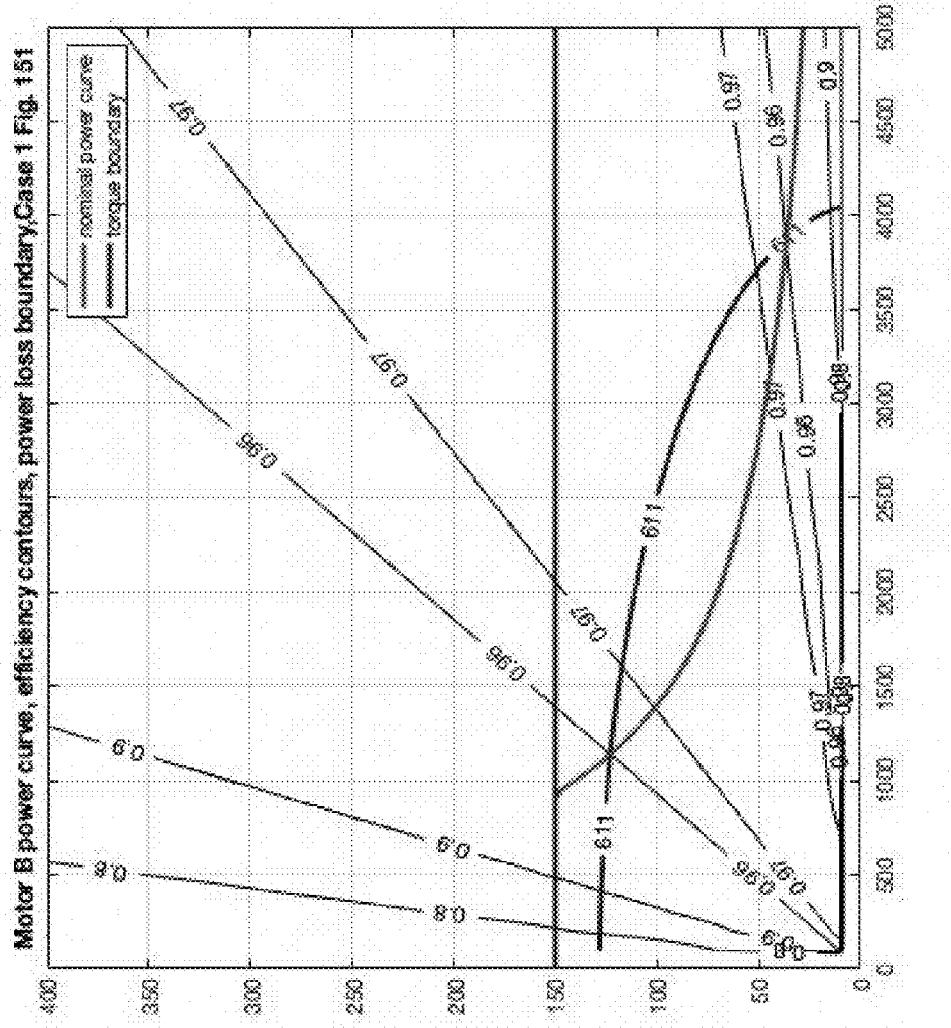
Figure 8C:
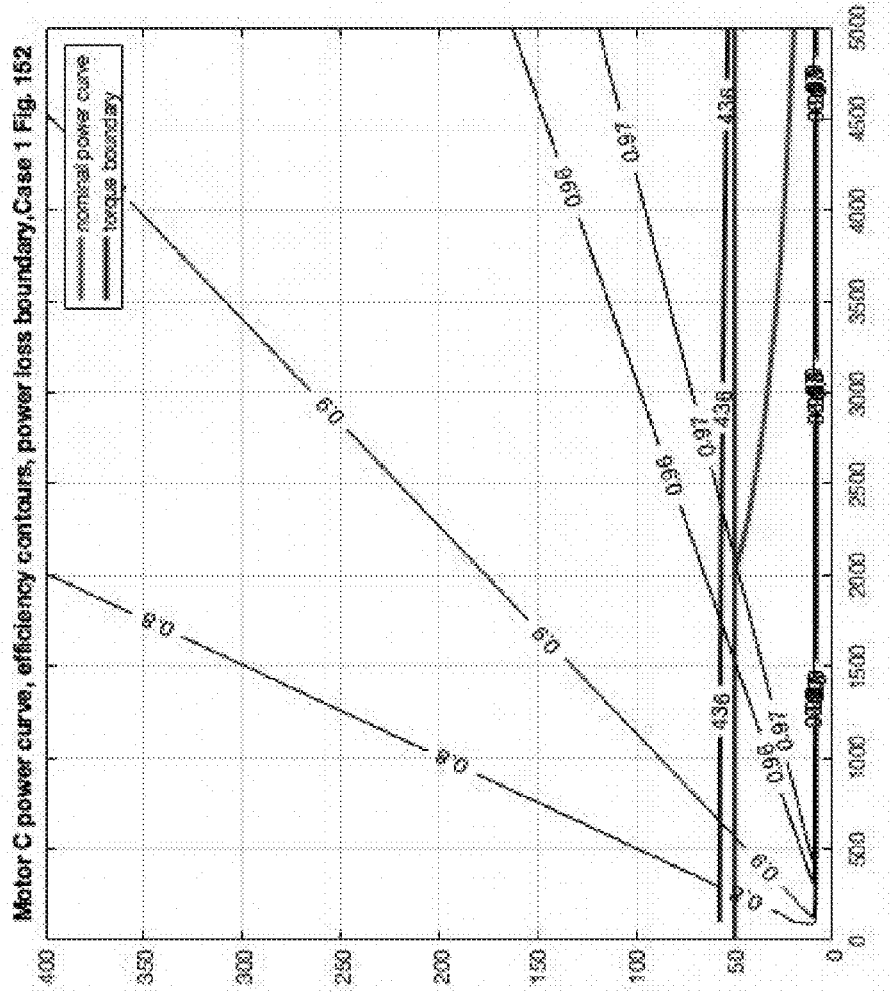
Figure 9A:
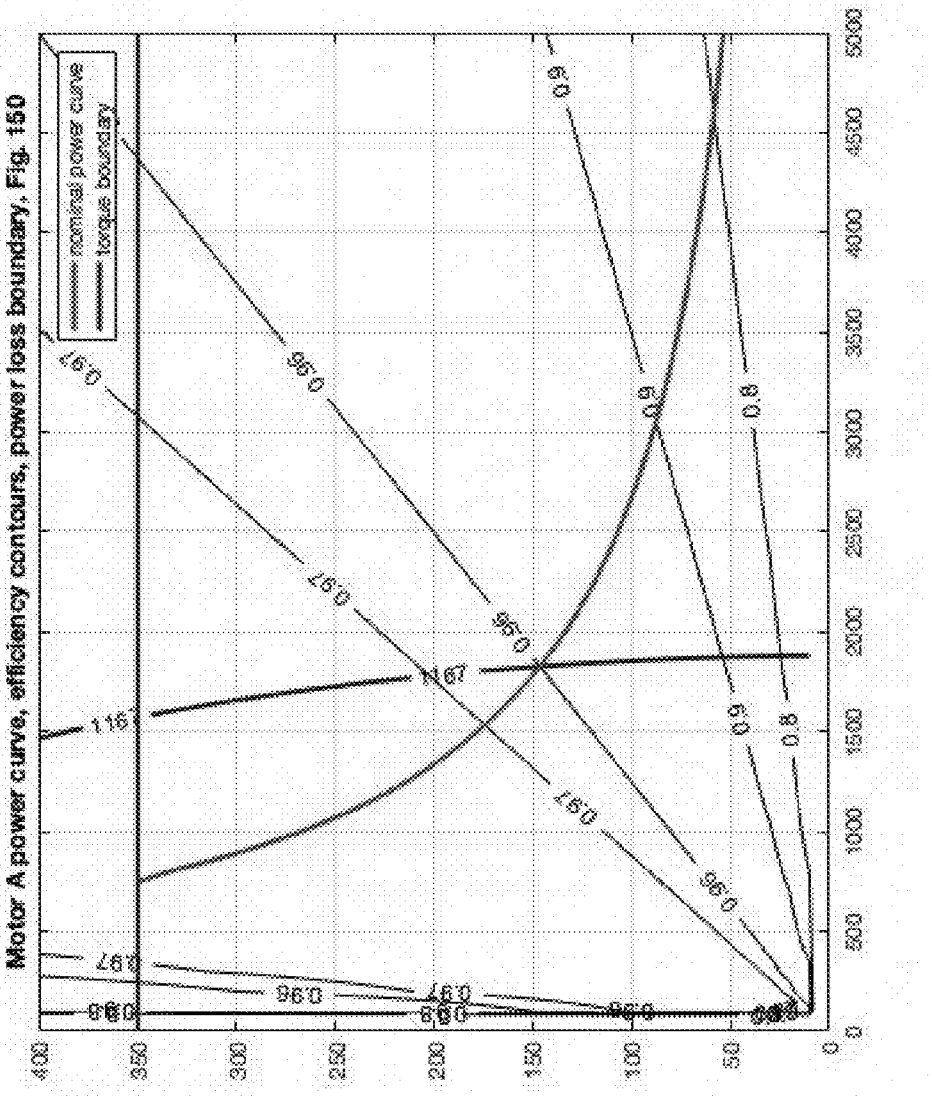
FIGS. 9a-c shows the power curve and efficiency contours for the three small motors of the Case 2 illustrative example of the operation of the multi-motor system, according to an embodiment of the invention.
Figure 9B:
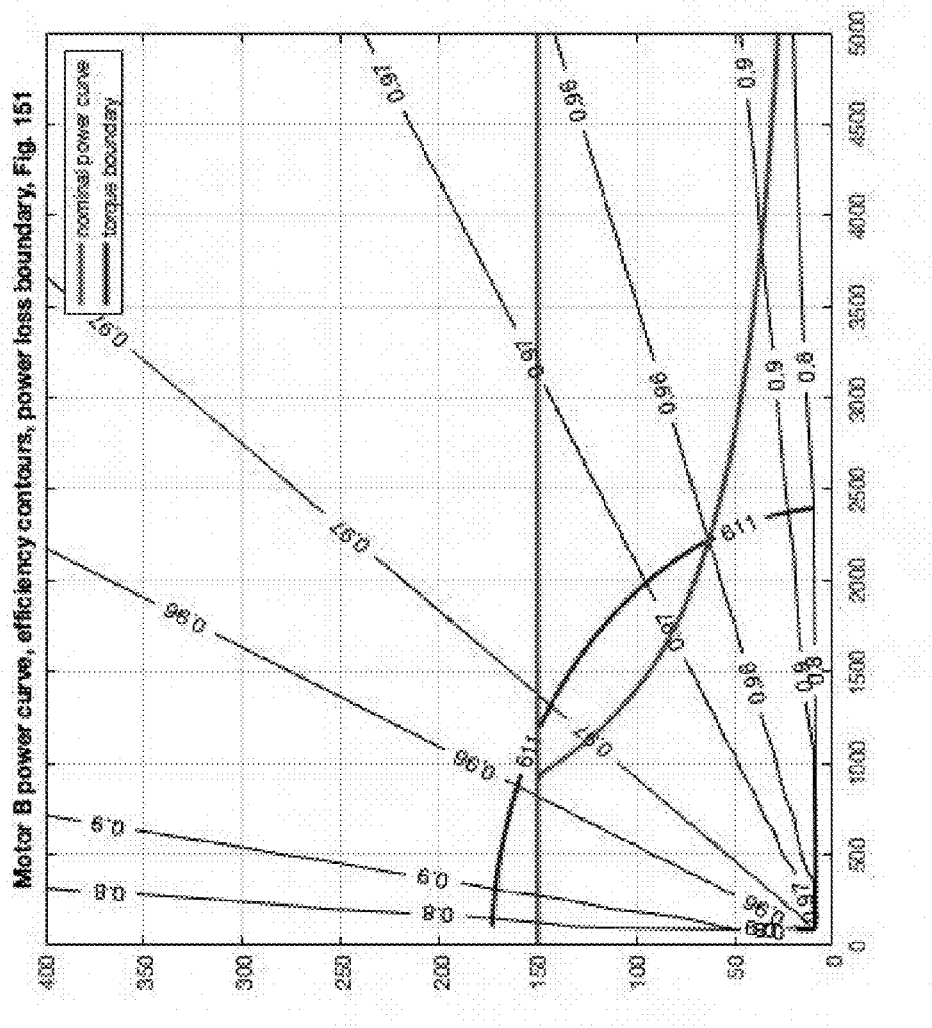
Figure 9C:
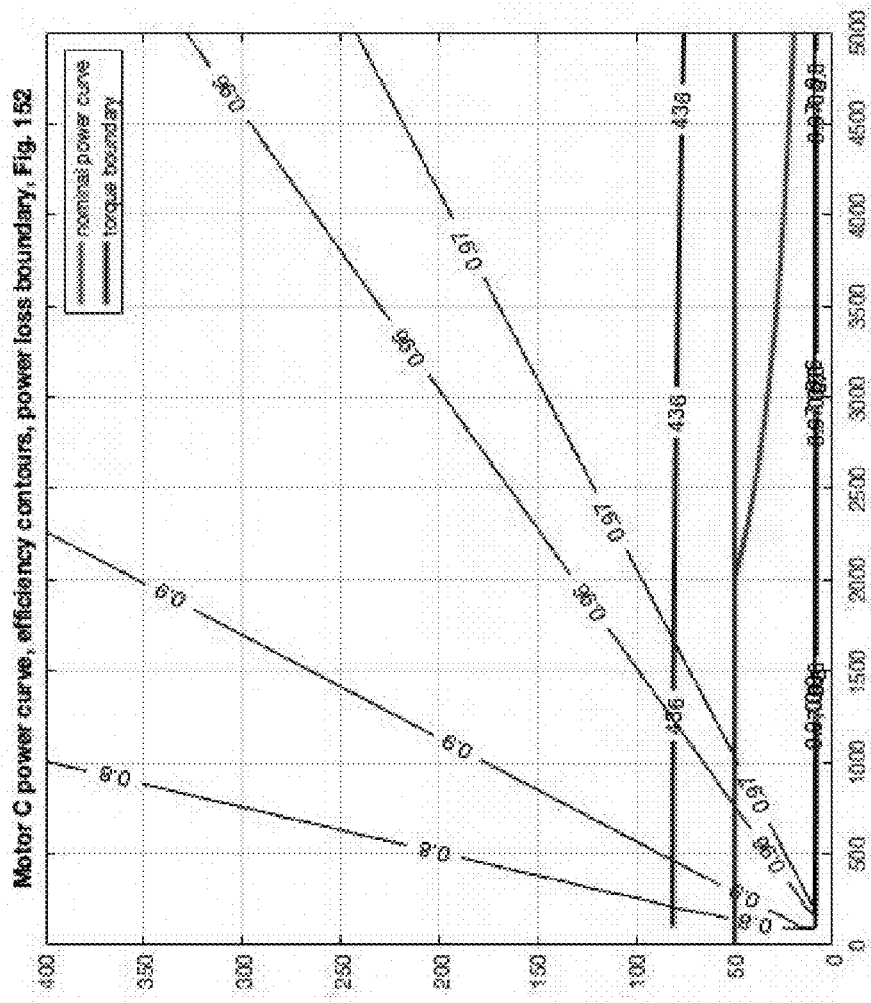

FIG. 6 shows the power curve and efficiency contours for the three large motors of the Case 1 illustrative example of the operation of the multi-motor system, according to an embodiment of the invention. FIG. 7 shows the power curve and efficiency contours for the three large motors of the Case 2 illustrative example of the operation of the multi-motor system, according to an embodiment of the invention. FIG. 8 shows the power curve and efficiency contours for the three small motors of the Case 1 illustrative example of the operation of the multi-motor system, according to an embodiment of the invention. FIG. 9 shows the power curve and efficiency contours for the three small motors of the Case 2 illustrative example of the operation of the multi-motor system, according to an embodiment of the invention.

For large motors, peak efficiency regions are spread optimally over the (n,T) space. For small motors, the power curves are limited by boundaries (constraints), thus only (n,T) points within the boundaries are considered valid. In particular, a power loss boundary limits the smaller motors. The simulation does not allow the smaller motors to operate above the power loss boundary. The power curves for the large motors have no boundaries, hence every (n,T) can be serviced by a large motor. The simulation allows the larger motors to operate over the whole plane (defined by the (n,T) driving cycle points). Also, while a large motor and a small motor may have the same efficiency distribution, they may have different distributions of valid (n,T) points.

Losses for the motors were calculated from nominal power curve values. For the modeling and tests described herein, the motor power loss values used an estimated overall 0.96 efficiency to simplify the calculations.

Tested Driving Cycles

The driving cycles used to test the system described herein are provided by the EPA (see https://www.epa.gov/vehicle-and-fuel-emissions-testing/dynamometer-drive-schedules). Each driving cycle is characterized by the required speed and torque at each point. Additional information concerning the underlying driving cycles used to test the system are provided below.

Figure 10A:
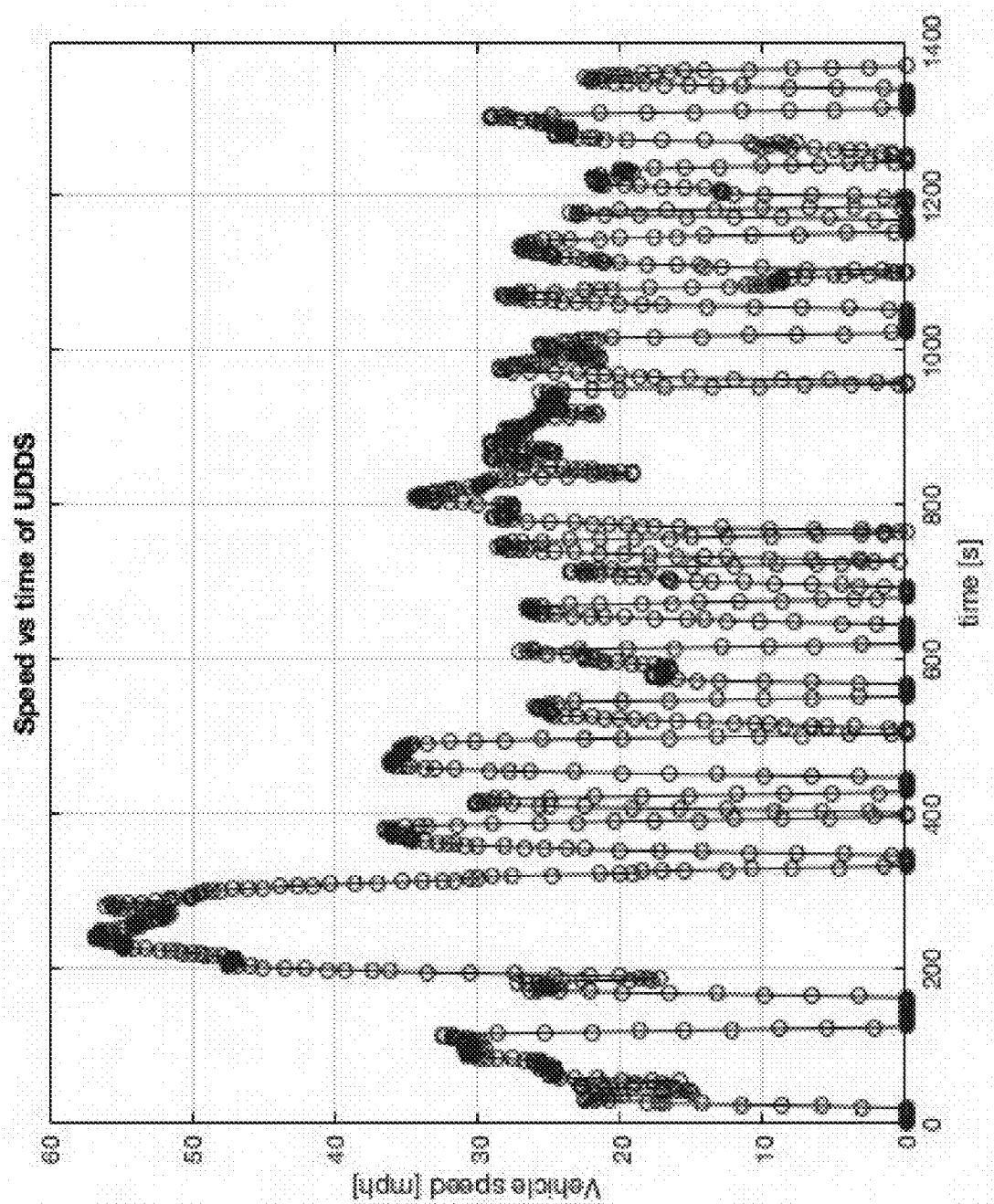
FIG. 10a is a graph showing the speed versus time for the UDDS driving cycle used in the testing of an embodiment of the invention.

The EPA Urban Dynamometer Driving Schedule (UDDS) is commonly called the "LA4" or "the city test" and represents city driving conditions. It is used for light duty vehicle testing. The UN/ECE Regulation 53 refers to the EPA UDDS as the "Test Equivalent to the Type 1 Test (verifying emissions after a cold start)." FIG. 10a is a graph showing the speed versus time for the UDDS driving cycle.

Figure 10B:
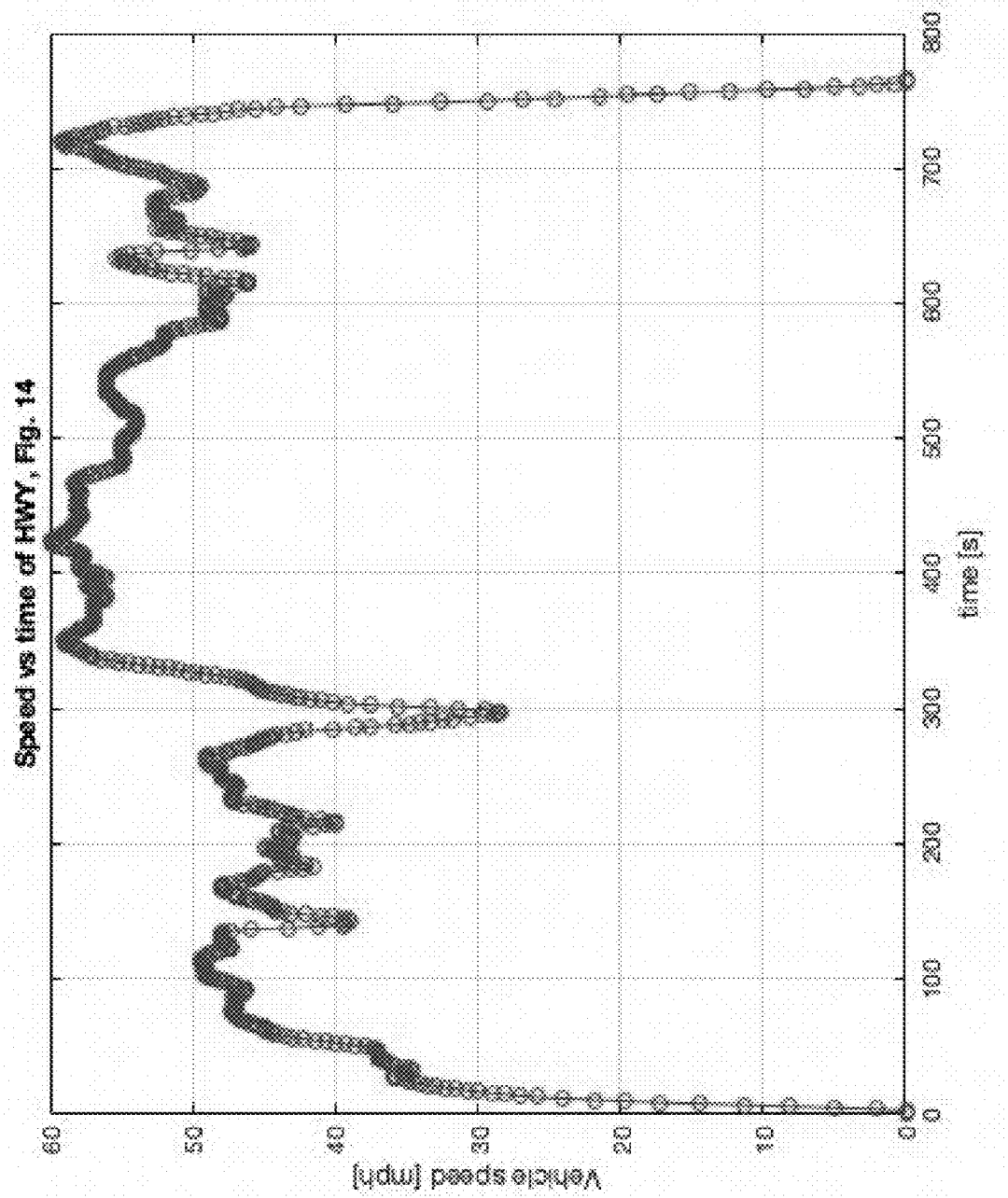
FIG. 10b is a graph showing the speed versus time for the HWFET driving cycle used in the testing of an embodiment of the invention.

The Highway Fuel Economy Driving Schedule (HWFET) represents highway driving conditions under 60 mph. FIG. 10b is a graph showing the speed versus time for the HWFET driving cycle.

Figure 10C:
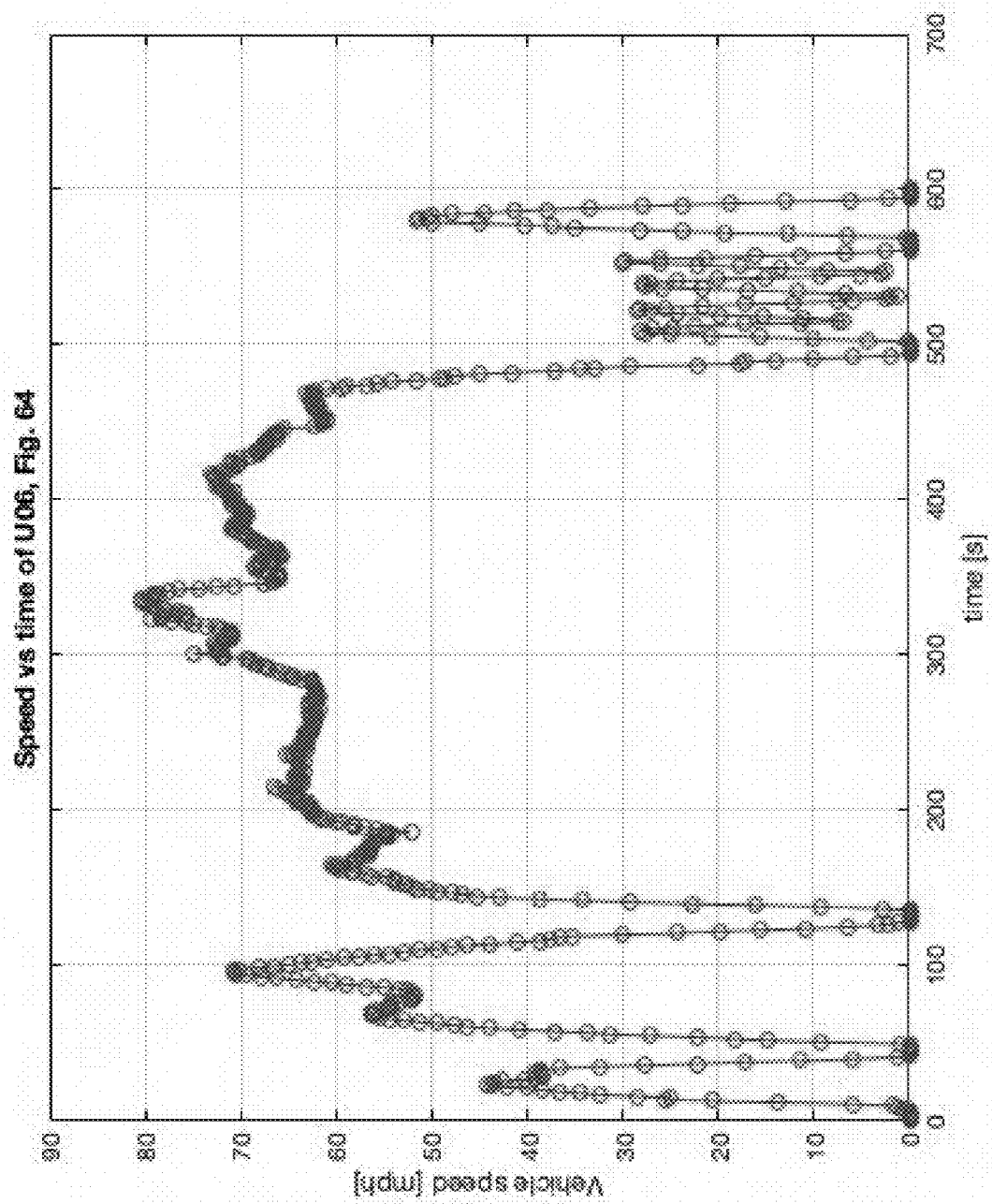
FIG. 10c is a graph showing the speed versus time for the US06 driving cycle used in the testing of an embodiment of the invention.

The US06 driving schedule is a high acceleration aggressive driving schedule that is often identified as the "Supplemental FTP" driving schedule. FIG. 10c is a graph showing the speed versus time for the US06 driving cycle.

Results of Simulated Testing

The simulation of the system using two different sets of motors (Case 1 and Case 2) showed that, using the systems and techniques described herein, sets of three small motors exhibited the same efficiency as three large motors, and exhibit better efficiency that any individual large motor. As a result, the systems and techniques described herein allow for the implementation of multi-motor systems comprised of small motors with greater efficiency than large motor systems, resulting in improved performance and reduced costs for motor systems.

Optimization of Energy Generation

As noted above, the multiple motors in the system may also serve as generators through the reverse process to that which is described above, wherein torque from the driveshaft is distributed to the motors in order to use them to generate current for the battery. For example, when the vehicle is braking, the controller may selectively engage the motors to receive available torque in the driveshaft, thereby generating current. In such a scenario, the respective drivers 118a, 118b, 118c, serve as rectifier systems. Based on torque command signals TA, TB, TC from controller 120, each rectifier system acts as a power converter, and controls the proportion of available torque handled (and thus the proportion of overall current generated) by its corresponding generator, as further described below. Each rectifier system controls the degree to which its respective generator engages with the generator shaft 104 to handle a portion of the available torque. Each rectifier system adjusts the pulse width modulation (PWM) duty cycle of the corresponding generator to control the amount of torque handled by that generator, and thus the amount of current generated by that generator. Current sensors 112a, 112b, 112c monitor the current generated by each generator, which is provided to monitor 114 which calculates the electromagnetic torque T generated by the generators. A second monitor 116 takes in the electromagnetic torque T and the generator shaft speed n and calculates the energy out of the generators EG. Each rectifier then supplies energy to the DC high-voltage power bus 128. A AC/DC converter 130 serves as an inverter and transfers energy from the bus 128 to an external energy load, such as an energy grid or energy storage system.

Optimization of Multi-Motor System Design

The selection of motors used to build a multi-motor system, such as the three-motor system 100 described above, can also be optimized for efficiency based on the optimization techniques described above. Given a set of motors each having a specific set of characteristics (e.g., efficiency characteristics, torque boundary, power boundary, etc.), and given a desired number of motors (e.g., three motors), the optimal motors for a given driving cycle or set of cycles, which most closely match the observed driving pattern (driving behavior, common road conditions, trip characteristics, etc.) of a motorist, can be determined using the raster scan technique described above. It will be readily appreciated that the methods and processes described herein for selecting the optimal contribution of motors to achieve a certain criteria can be used to determine which motors to include in a multi-motor switching system, including based on factors relating to the performance and efficiency of the motors, while controlling for other factors such as cost, size, and other characteristics of motors.

According to an embodiment of the invention, the following system and process is used to select motors to include in a multi-motor switching system. First, driving pattern data is received by the motor selection system. The driving pattern data contains similar data to the exemplary "driving cycle" data described above, and may be generated by similar processes. In one example, the driving pattern data is generated by recording the acceleration and torque conditions of an individual in a given test vehicle as recorded over the course of one or more driving events by a particular individual, and the driving data is combined to result in the final driving pattern data for the motor selection process.

Once the driving pattern data has been received, the motor selection system receives motor information data from a motor information database. This motor information data is stored in a database, and contains data pertaining to the operating characteristics of multiple motors, including the power curve and efficiency contour characteristics of each such motor; mechanical data for the vehicle, such as the air friction coefficient; thermal response parameters for each motor k in the system (i.e., Motors A, B, and C), such as the thermal conductivity of the motor steel and other factors relating to heat generation and dissipation; initial motor model resistances $R_k(T'_{k0})$ for each motor k in the system; and electromechanical parameters of the motors, such as the motor bus voltage, stored by the system in the database. The motor information data may also include other information relating to the motors, such as the cost, weight and the space of each such motor. The motor information database may be local to the motor selection system, or it may be a remote database that is accessed via a network connection.

The motor selection system receives as a variable input the number of motors that are to be selected. The number of motors operates as a constraint on the motor selection process, such that the motor system outputs a fixed number of motors (e.g., where the number of motors input into the system is three, only three motors will be selected to fit into the car).

Using the driving pattern data, the motor information data, and the number of motors to be selected, the motor selection system performs the global optimization process to determine an optimized set of motors for the driving pattern. In the global optimization process performed by the motor selection system, the driving pattern data corresponds to the driving cycle over which the global optimization process in FIG. 11 is described; the motor characteristics for the optimization analysis correspond to the motor efficiency data (including the motor parameters) used for the optimization process; and the number of dimensions in the raster scan is set by the input number of motors to be selected. The cost function can be defined based on desired criteria, such as minimizing energy consumption or maximizing acceleration. In addition to efficiency, the selection of motors can further take into account additional constraints and boundaries, such as cost, weight and the space of the motors. Following the global optimization process, the motor selection system outputs the combination of motors that provides for the most optimal solution to satisfy the desired criteria. In this way, the motor selection system is able to provide a set of motors that is customized towards an individual's driving patterns, and which provides a user with an optimized (e.g., most energy efficient) set of motors.

In addition, based on the driving pattern data and the driver's objective (such as maximizing the driving range or minimizing the driving time), the controller can make suggestions to drivers about modifying their driving behavior in order to meet the driving objective more optimally.

Beyond the raster scan technique described above, other techniques may be used to optimize the selection of motors for a multi-motor system, including the following: Nelder-Mead simplex algorithm, gradient descent, Newton's Method, or the Newton-Raphson Method.

While the invention has been described in terms of several preferred embodiments, it should be understood that there are many alterations, permutations and equivalents that fall within the scope of this invention. It should also be noted that there are alternative ways of implementing both the process and apparatus of the present invention. For example, steps do not necessarily need to occur in the orders shown in the accompanying figures and may be rearranged as appropriate. It is therefore intended that the appended claim includes all such alterations, permutations and equivalents as fall within the true spirit and scope of the present invention.

Components of the system above can be implemented in digital electronic circuitry, or in computer hardware, firmware, software or in combinations thereof. Components of the system can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer or multiple computers.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by or incorporated in special purpose logic circuitry.

The use of the terms "a" and "an" and "the" and similar references in the context of this disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., such as, preferred, preferably) provided herein, is intended merely to further illustrate the content of the disclosure and does not pose a limitation on the scope of the claims. No language in the specification should be construed as indicating any non-claimed element as essential to the practice of the present disclosure.

Multiple embodiments are described herein. Of these, variations of the disclosed embodiments will become apparent to those of ordinary skill in the art upon reading the foregoing disclosure. The inventors expect skilled artisans to employ such variations as appropriate (e.g., altering or combining features or embodiments), and the inventors intend for the invention to be practiced otherwise than as specifically described herein.

Accordingly, this invention includes all modifications and equivalents of the subject matter recited in the claims appended hereto as permitted by applicable law. Moreover, any combination of the above described elements in all possible variations thereof is encompassed by the invention unless otherwise indicated herein or otherwise clearly contradicted by context.

We claim:

1. A multi-motor system capable of performing a global optimization in order to determine an optimal contribution of torque from motors in a vehicle based on a given torque demand in order to achieve a performance objective over an entire driving cycle while remaining within one or more constraints, the system comprising:
    a plurality of motors mechanically coupled to a shaft, wherein the plurality of motors are electric motors;
    a database that stores efficiency data associated with each of the plurality of motors, wherein the efficiency data represents the efficiency of a motor across combinations of speed and torque;
    a controller for receiving driving cycle information for a driving cycle, and for generating torque commands for the plurality of motors;
    wherein the controller generates torque commands for the plurality of motors by performing an optimization analysis across all time periods in the driving cycle with respect to potential combinations of torque contributions by the motors, the optimization analysis comprising:
        determining based on the driving cycle information a required shaft speed and torque across all time periods in the driving cycle;
        calculating, based on the efficiency data, a cost function for the performance objective across all time periods in the driving cycle for each of the potential combinations of torque contributions by the plurality of motors;
        identifying from the potential combinations of torque contributions one or more combinations of torque contributions that meet the performance objective based on the cost function and that remains within the one or more constraints; and
        generating, for each time period in the driving cycle, torque command signals for each of the plurality of motors in order to cause the plurality of motors to drive the shaft according to the one or more combinations of torque contributions to meet the performance objective while remaining within the one or more constraints.

2. The system of claim 1 wherein the performance objective is meeting a target efficiency value and where the cost function for each of the potential combinations of torque contributions by the motors is the amount of energy used.

3. The system of claim 2 wherein the controller estimates for each time period in the driving cycle the energy consumed, and wherein the controller outputs an estimated total energy consumption for the driving cycle.

4. The system of claim 2 wherein the optimization analysis performed by the controller further comprises integrating an optimization of energy regeneration from braking.

5. The system of claim 1 wherein the one or more constraints includes the temperature for each motor.

6. The system of claim 1 wherein the optimization analysis performed by the controller further comprises, for each time period in the driving cycle, calculating the efficiency of each motor in the plurality of motors at the next period in the driving cycle based on the efficiency data and one or more transients.

7. The system of claim 6 wherein the one or more transients includes thermal transients, and wherein the optimization analysis performed by the controller further comprises calculating thermal transients to determine an estimated temperature for each of the plurality of motors at the end of the next time period.

8. The system of claim 1 wherein the system is housed within an electric vehicle.

9. The system of claim 1 wherein the system further comprises a trip planning tool, and wherein the trip planning tool generates the driving cycle information.

10. The system of claim 1 wherein the performance objective is maximizing driving range.

11. A method of performing a global optimization in order to determine an optimal contribution of torque from motors in a vehicle based on a given torque demand in order to achieve a performance objective over an entire driving cycle while remaining within one or more constraints, the method comprising:
    storing efficiency data associated with each of the plurality of motors coupled to a shaft, wherein the plurality of motors are electric motors, and wherein the efficiency data represents the efficiency of a motor across combinations of speed and torque;
    receiving driving cycle information for a driving cycle;
    generating torque commands for the plurality of motors by performing an optimization analysis across all time periods in the driving cycle with respect to potential combinations of torque contributions by the motors, the optimization analysis comprising:
        determining based on the driving cycle information a required shaft speed and torque across all time periods in the driving cycle;
        calculating, based on the efficiency data, a cost function for the performance objective across all time periods in the driving cycle for each of the potential combinations of torque contributions by the plurality of motors;
        identifying from the potential combinations of torque contributions one or more combinations of torque contributions that meet the performance objective based on the cost function and that remains within the one or more constraints; and
        generating, for each time period in the driving cycle, torque command signals for each of the plurality of motors in order to cause the plurality of motors to drive the shaft according to the one or more combinations of torque contributions to meet the performance objective while remaining within the one or more constraints.

12. The method of claim 11 wherein the performance objective is meeting a target efficiency value and where the cost function for each of the potential combinations of torque contributions by the motors is the amount of energy used.

13. The method of claim 12 further comprising estimating for each time period in the driving cycle the energy consumed, and outputting an estimated total energy consumption for the driving cycle.

14. The method of claim 12 wherein the optimization analysis performed by the controller further comprises integrating an optimization of energy regeneration from braking.

15. The method of claim 11 wherein the one or more constraints includes the temperature for each motor.

16. The method of claim 11 wherein the optimization analysis further comprises, for each time period in the driving cycle, calculating the efficiency of each motor in the plurality of motors at the next period in the driving cycle based on the efficiency data and one or more transients.

17. The method of claim 16 wherein the one or more transients includes thermal transients, and wherein the optimization analysis further comprises calculating thermal transients to determine an estimated temperature for each of the plurality of motors at the end of the next time period.

18. The method of claim 11 wherein the method is performed by a controller housed within an electric vehicle.

19. The method of claim 11 wherein the step of generating the driving cycle information is performed using a trip planning tool.

20. The method of claim 11 wherein the performance objective is maximizing driving range.

* * * * *